US012637161B2

(12) United States Patent
Fraas et al.

(10) Patent No.: US 12,637,161 B2
(45) Date of Patent: May 26, 2026

(54) METHODS AND DEVICES FOR ASSEMBLING REFUSE VEHICLES

(71) Applicant: The Heil Co., Chattanooga, TN (US)

(72) Inventors: Mark Fraas, Centre, AL (US); Malatesh Patil, Bengaluru (IN); Eric Dale Hughes, Gaylesville, AL (US)

(73) Assignee: The Heil Co., Chattanooga, TN (US)

( * ) Notice: Subject to any disclaimer, the term of this patent is extended or adjusted under 35 U.S.C. 154(b) by 363 days.

(21) Appl. No.: 18/314,695

(22) Filed: May 9, 2023

(65) Prior Publication Data

US 2023/0356933 A1     Nov. 9, 2023

Related U.S. Application Data

(60) Provisional application No. 63/339,773, filed on May 9, 2022.

(51) Int. Cl.
  B62D 65/16     (2006.01)
  B62D 65/02     (2006.01)
  B65F 3/00     (2006.01)

(52) U.S. Cl.
  CPC ........... B62D 65/16 (2013.01); B62D 65/024 (2013.01); B65F 3/00 (2013.01); B65F 2003/006 (2013.01)

(58) Field of Classification Search
  CPC . B62D 65/16; B62D 65/024; B65F 2003/006; B65F 3/00–3/28
  See application file for complete search history.

(56) References Cited

U.S. PATENT DOCUMENTS

| | | | |
|---|---|---|---|
| 3,090,512 A | 5/1963 | Dempster et al. | |
| 3,112,834 A | 12/1963 | Dempster et al. | |
| 4,547,118 A | 10/1985 | Pittenger | |
| 4,699,557 A | 10/1987 | Barnes | |
| 5,090,105 A * | 2/1992 | DeRees ............... | B62D 63/025 |
| | | | 29/469 |
| 5,413,448 A * | 5/1995 | Peshkin ............... | B65F 1/1468 |
| | | | 414/679 |
| 7,063,495 B1 | 6/2006 | Johnson | |
| 7,210,890 B2 | 5/2007 | Curotto et al. | |
| 7,553,121 B2 | 6/2009 | Curotto et al. | |
| 9,809,383 B2 | 11/2017 | Ford | |
| 9,926,134 B2 | 3/2018 | Ford | |
| 11,787,629 B2 | 10/2023 | Evans et al. | |
| 2002/0152615 A1* | 10/2002 | Kurihara ............... | B23P 21/004 |
| | | | 29/897 |
| 2012/0112492 A1* | 5/2012 | Grumbo ................ | B62D 21/02 |
| | | | 29/428 |
| 2017/0361885 A1* | 12/2017 | Macri .................... | B62D 65/06 |
| 2020/0148292 A1* | 5/2020 | Hosbach ............... | B62D 65/04 |
| 2021/0284250 A1* | 9/2021 | Brooks ................. | B62D 65/16 |
| 2022/0089366 A1 | 3/2022 | Evans et al. | |
| 2023/0406618 A1 | 12/2023 | Evans et al. | |

* cited by examiner

*Primary Examiner* — Sarang Afzali
*Assistant Examiner* — Darrell C Ford
(74) *Attorney, Agent, or Firm* — Fish & Richardson P.C.

(57)     ABSTRACT

A method of assembling a refuse vehicle includes coupling body sub-assemblies to one another on a chassis after the sub-assemblies are painted. The body sub-assemblies are assembled from refuse vehicle body components. Each body sub-assembly is painted independent of other body sub-assemblies. After the body sub-assemblies are painted, the painted body sub-assemblies are assembled to one another on the chassis to provide a painted body of the refuse vehicle.

20 Claims, 15 Drawing Sheets

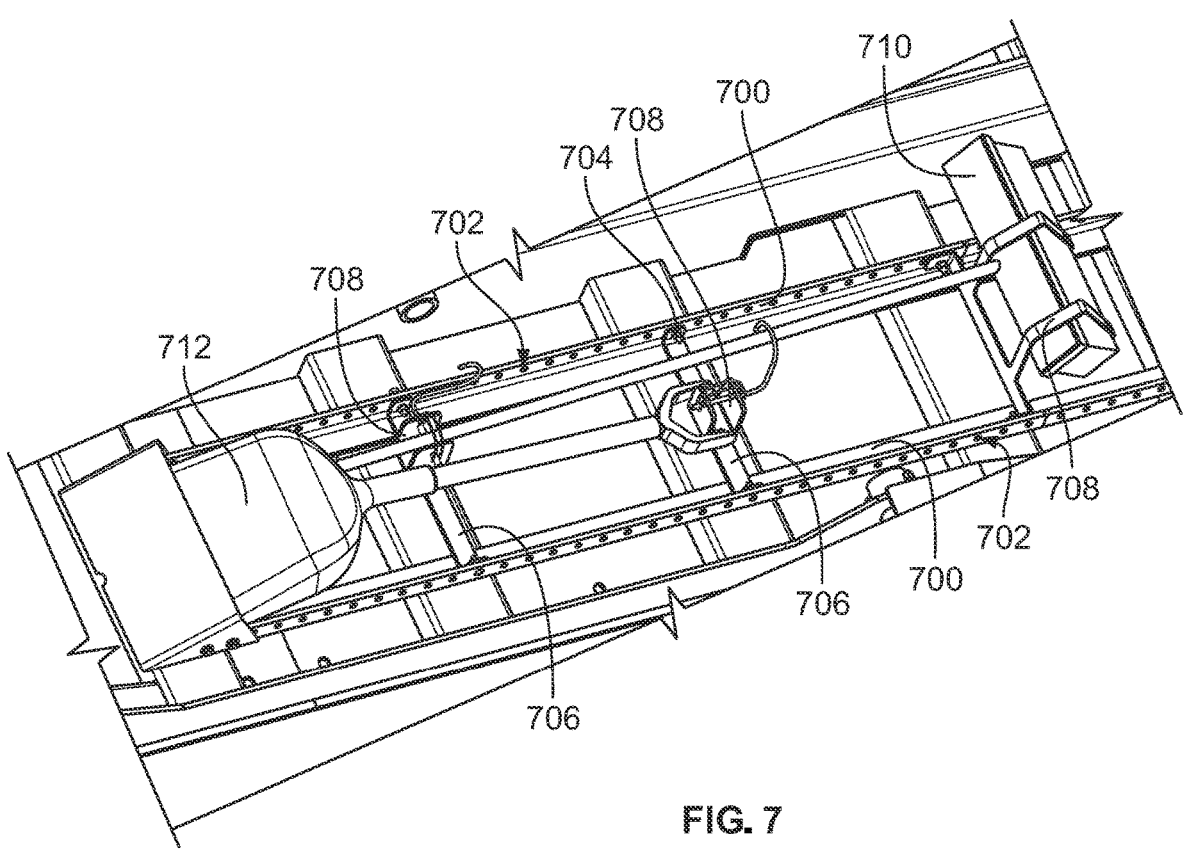
FIG. 7
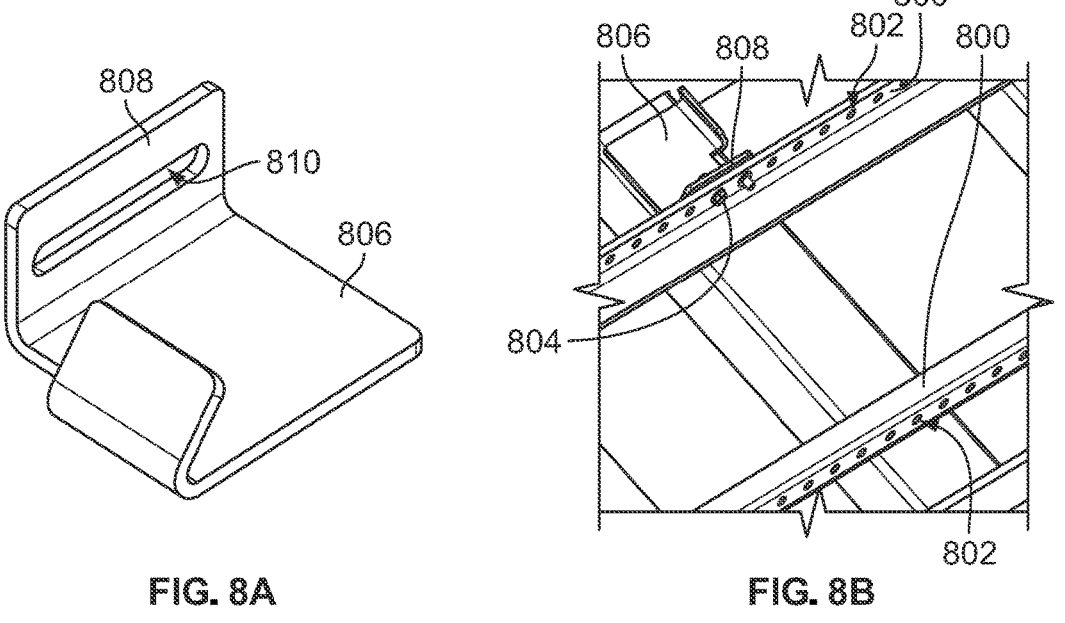
FIG. 8A
FIG. 8B

1100

1102 1102    1104

1102 1102

1200

1202

1206    1204

1204

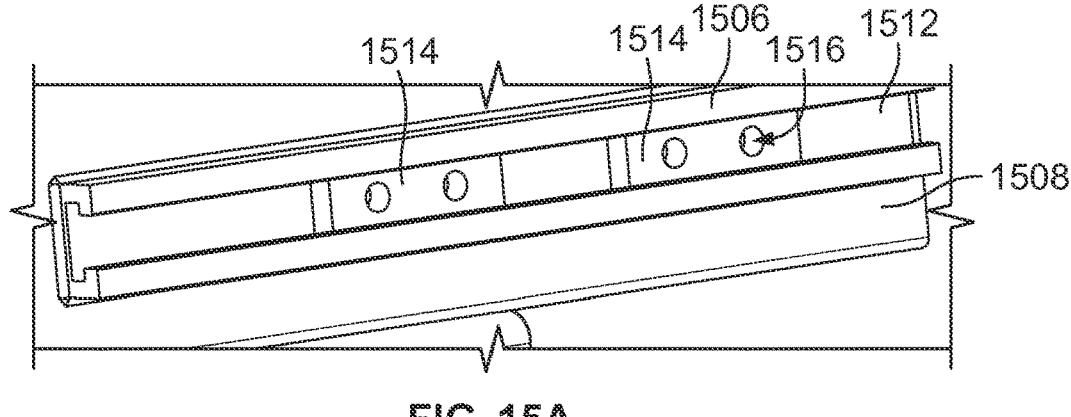
FIG. 15A
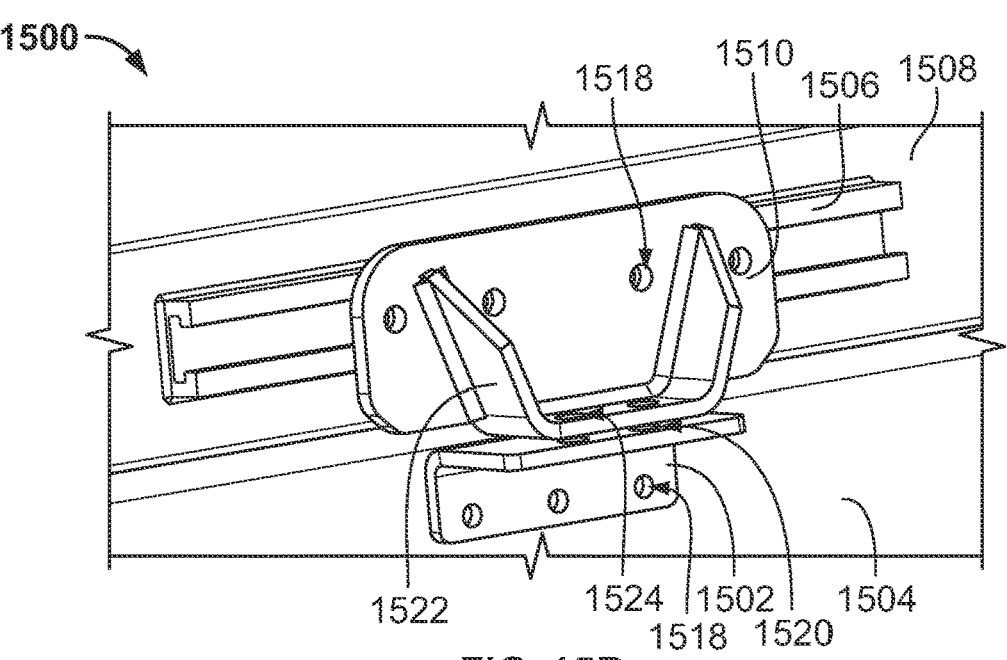
FIG. 15B
FIG. 15C

METHODS AND DEVICES FOR ASSEMBLING REFUSE VEHICLES

CROSS-REFERENCE TO RELATED APPLICATION

This application claims the benefit under 35 U.S.C. § 119 (e) of U.S. Patent Application No. 63/339,773, entitled "Methods and Devices for Assembling Refuse Vehicles," filed May 9, 2022, which is incorporated herein by reference in its entirety.

TECHNICAL FIELD

This disclosure generally relates to devices and methods of assembling a refuse vehicle, and more particularly to devices and methods of assembling a refuse vehicle, which include assembling the refuse vehicle after painting its various components and sub-assemblies.

BACKGROUND

Methods of assembling vehicles (e.g., refuse vehicles) include welding, assembling, and painting of vehicle components. These conventional methods of assembling vehicles generally include welding and assembling vehicle sub-assemblies on the chassis of the refuse vehicle prior to painting the assembled vehicle components. It is often desired to assemble one or more refuse vehicle sub-assemblies after the painting step. Improvements in the design of methods for assembling refuse vehicles are continually sought.

SUMMARY

In general, this disclosure relates to methods of refuse vehicle assembly that include assembling various sub-assemblies after painting of these sub-assemblies and their components.

One aspect of the present disclosure features a method of assembling a refuse vehicle, the method including: obtaining a chassis and a plurality of refuse vehicle body components; assembling a plurality of body sub-assemblies from the plurality of refuse vehicle body components; painting each body sub-assembly independent of other body sub-assemblies in the plurality of body sub-assemblies; and after painting, assembling the plurality of painted body sub-assemblies to one another on the chassis to provide a painted body of the refuse vehicle.

Embodiments may include one or more of the following features.

In some embodiments, at least one of the body sub-assemblies includes a tailgate, and at least one of the plurality of body components is a tailgate locking mechanism including a lug.

In some embodiments, at least one of the body sub-assemblies includes a mounting system configured to mount a refuse vehicle body to a frame, and wherein at least two of the plurality of body components are a track and a first plate fixed to the chassis.

In some embodiments, at least one of the plurality of body components is a second plate configured to translate longitudinally along the track into alignment with the first plate.

In some embodiments, wherein at least one of the body sub-assemblies includes a hydraulic cylinder, and wherein at least one of the plurality of body components is a hinged clamp configured to secure the hydraulic cylinder.

In some embodiments, at least one of the body sub-assemblies includes a cab protector, and wherein at least one of the plurality of body components is cab protector mounting plate configured to be secured to the cab protector by mechanical fasteners.

In some embodiments, at least one of the body sub-assemblies includes a washout tank, and wherein at least one of the plurality of body components is a tank mounting system including one or more straps configured to secure the washout tank.

In some embodiments, the plurality of the body sub-assemblies includes at least one of a mud flap, a broom, a shovel, a prop stop, a fire extinguisher, and a wheel chock, and wherein at least one of the plurality of body components is a mounting bracket defining one or more holes configured to receive a mechanical fastener to secure the at least one of the mud flap, broom, shovel, prop stop, fire extinguisher, and wheel chock to the refuse vehicle.

In some embodiments, at least one of the plurality of body components is a rail mounting system including one or more elongated rails fixed to the chassis, the one or more elongated rails configured to secure at least one refuse vehicle body component of the plurality of refuse vehicle body components.

In some embodiments, at least one of the body sub-assemblies includes a hopper door, and wherein at least one of the plurality of body components is a door lifting mechanism including a lug.

In some embodiments, at least one of the body sub-assemblies includes a hydraulic cylinder assembly, and wherein at least one of the plurality of body components is a pin cover configured to secure a hydraulic cylinder pin.

In some embodiments, the hydraulic cylinder assembly includes one or more hydraulic cylinders configured to actuate a packer mechanism.

In some embodiments, at least one of the body sub-assemblies includes a service hoist cylinder, and wherein at least one of the plurality of body components is a hoist bracket configured to secure the service hoist cylinder.

In some embodiments, painting each body sub-assembly independent of other body sub-assemblies in the plurality of body sub-assemblies includes powder-coating each body sub-assembly independent of other body sub-assemblies in the plurality of body sub-assemblies.

In some embodiments, assembling at least one of the plurality of body sub-assemblies includes welding a first vehicle body component to a second vehicle body component.

In some embodiments, assembling the plurality of painted body sub-assemblies includes attaching a first body sub-assembly to a second body sub-assembly using only mechanical fasteners.

In some embodiments, assembling the plurality of painted body sub-assemblies includes attaching the plurality of painted body sub-assemblies to the chassis using only mechanical fasteners.

In some embodiments, assembling the plurality of the painted body sub-assemblies excludes welding the sub-assemblies.

In some embodiments, assembling the plurality of painted body sub-assemblies includes connecting one or more electrical and/or hydraulic components to one or more of the sub-assemblies, the chassis, and the refuse vehicle body.

In some embodiments, the one or more electrical and/or hydraulic components include one or more of an electrical harness, a hydraulic cylinder, a controller, a hydraulic hose, and a hydraulic valve.

Another aspect of the present disclosure features a refuse vehicle including a vehicle chassis including a frame configured to support a refuse vehicle body and a mounting system configured to mount the refuse vehicle body to the frame. In some embodiments, the mounting system includes: a first plate fixed to the vehicle chassis; a track fixed to the refuse vehicle body; and a second plate configured to translate longitudinally along the track into alignment with the first plate. In some embodiments, the aligned first and second plates are securable to one another by mechanical fasteners.

In some embodiments, the frame includes an elongated rail.

In some embodiments, the track defines a channel configured to engage one or more brackets.

In some embodiments, the mounting system includes the one or more brackets configured to be received in the channel.

In some embodiments, the one or more brackets are securable to the track.

In some embodiments, the mounting system includes one or more mechanical fasteners configured: i) to securely attach the second plate to the one or more brackets and ii) to securely attach the first plate to the second plate.

In some embodiments, the track is a T-slotted track.

In some embodiments, the refuse vehicle further includes a third plate configured to be securely attached to the first and second plates.

Another aspect of the present disclosure features a refuse vehicle including an arm sub-assembly including: a pair of arms; a torque tube coupled to and extending between the pair of arms; and an arm retaining ring configured to receive the torque tube. In some embodiments, the arm retaining ring includes: a first ring including a rim and two opposing, longitudinal portions extending from the rim, the two opposing, longitudinal portions defining a slot configured to receive a fastener; and a second ring including a pair of connector plates, each connector plate configured to couple to the two opposing, longitudinal portions.

In some embodiments, each connector plate of the pair of connector plates defines a hole configured to align with the slot and receive the fastener.

In some embodiments, the arm retaining ring is configured to securely couple to the torque tube by one or more mechanical fasteners configured to extend through the hole and the slot.

Yet another aspect of the present disclosure features a refuse vehicle including an arm sub-assembly including: a pair of arms; a torque tube coupled to and extending between the pair of arms; and an arm retaining ring configured to receive the torque tube. In some embodiments, the arm retaining ring includes a clamp and at least one step integrally formed with and extending radially from a side of the clamp.

In some embodiments, the clamp includes a first piece including a first step that is integrally formed with and extends radially from a first side of the clamp, and a second piece of including a second step that is integrally formed with and extends radially from a second side of the clamp, opposite to the first side.

Some embodiments of the methods and devices described below may provide one or more of the following advantages. Some embodiments described below may feature painting one or more sub-assemblies and other refuse vehicle body components (e.g., a chassis) prior to assembling the sub-assemblies and other refuse vehicle body components, which may help to facilitate and expedite the assembling process. For example, conventional methods of assembling refuse vehicles include painting all refuse vehicle body components after assembling the body sub-assemblies to one another on the chassis. However, oftentimes, alterations to the design of the refuse vehicle occur after assembling the body sub-assemblies to one another on the chassis and re-painting of such body sub-assemblies is required. Re-painting these body sub-assemblies can delay the assembling process as some refuse vehicle parts (e.g., hydraulic and/or electrical components) may be sensitive to liquids (e.g., paint), heat, mechanical abrasion, or the like, and, because they have been installed already, special care (e.g., uninstalling, moving, and/or protecting these parts) may be required to not damage these refuse vehicle parts during the re-painting step. Thus, by painting the refuse vehicle sub-assemblies before assembling of the plurality of sub-assemblies to one another on the chassis and by providing interchangeable components, some embodiments described below may advantageously reduce the time to assemble a refuse vehicle.

Additionally, some embodiments described below provide interchangeable components and/or components that have a standardized location within the refuse vehicle, which may further improve the process of manufacturing a refuse vehicle. For example, the locations of some refuse vehicle body components often vary among refuse vehicle types, which may lead to refuse vehicle design alterations. In contrast, the refuse vehicle body components described herein can have a standardized location within a refuse vehicle, across various refuse vehicle types (e.g., refuse vehicles having different chassis), which may reduce the number of design alterations during manufacturing. Furthermore, interchangeable refuse vehicle components (e.g., bolt-on components) can be coupled to the refuse vehicle at multiple locations, which may offer flexibility in terms of positioning and placement of such components. Therefore, the components described below may advantageously be painted prior to assembly and may not require re-adjustment of their position and, consequently, re-painting.

The details of one or more embodiments of the invention are set forth in the accompanying drawings and the description below. Other features, objects, and advantages of the invention will be apparent from the description, the drawings, and the claims.

DESCRIPTION OF DRAWINGS

FIG. 7 is a perspective view of a broom and shove of the refuse vehicle 1.

FIGS. 8A and 8B are perspective views of a prop stop of the refuse vehicle.

FIGS. 15A, 15B, and 15C are perspective views of a mounting system of the refuse vehicle, which includes a track and first and second plates.

Like reference symbols in the various drawings indicate like elements.

DETAILED DESCRIPTION

Embodiments described below include methods of assembling a refuse vehicle featuring the steps of painting individual body sub-assemblies prior to assembling such body sub-assemblies on a chassis of the refuse vehicle. Furthermore, embodiments described below include a plurality of body components that can be assembled into body sub-assemblies and be painted prior to assembling the body sub-assemblies to one another on the chassis.

Figure 1:
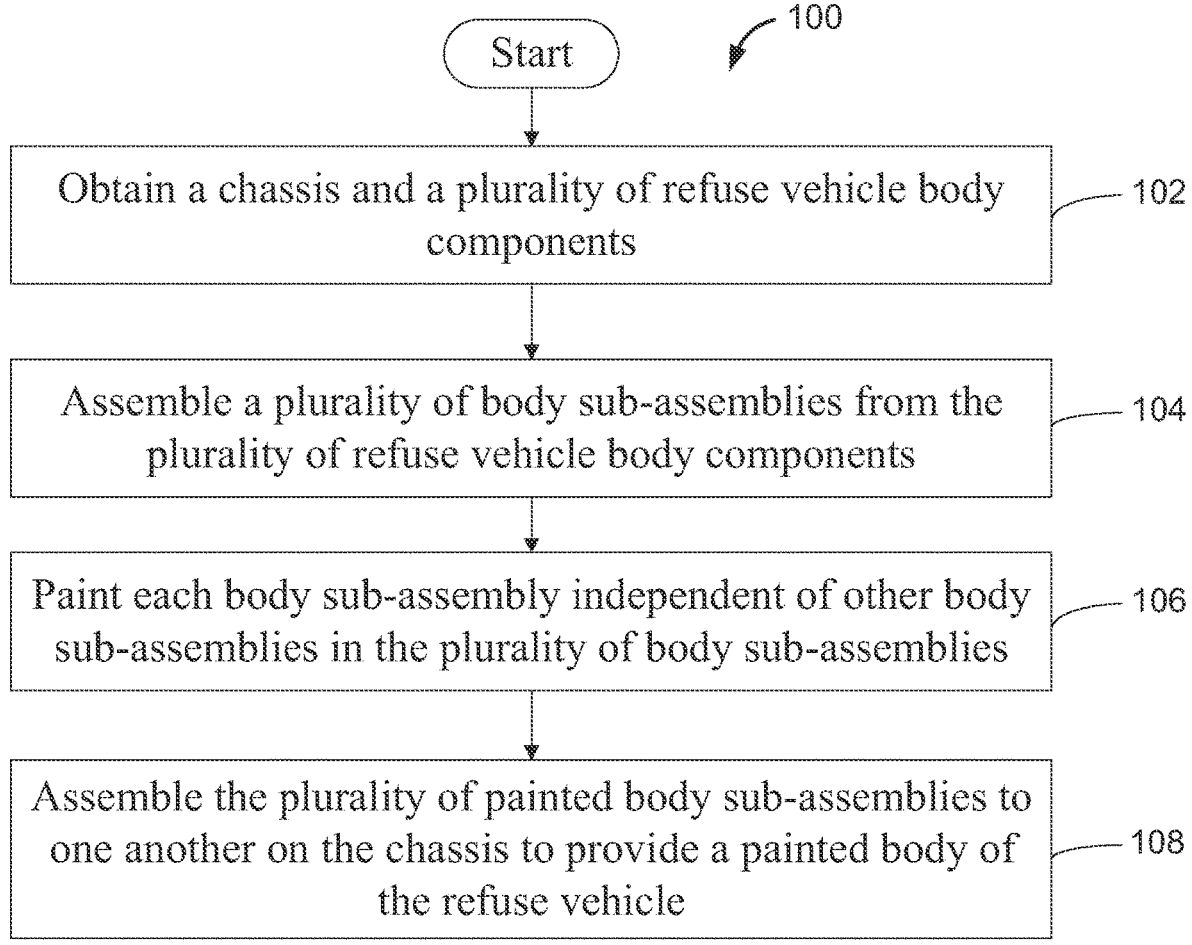
FIG. 1 is a flow chart of an example method of assembling a refuse vehicle.

FIG. 1 is a flow chart of an example method 100 of assembling a refuse vehicle. A vehicle assembler obtains a chassis and a plurality of vehicle body components (102). The plurality of vehicle body components can include a tailgate locking mechanism, a track and plate mounting mechanism, a hinged clamp, a cab protector mounting plate, a tank mounting system, mounting brackets, a rail mounting system, a door lifting mechanism, a pin cover, a hoist bracket, an arm retaining ring, or any combination thereof.

The vehicle assembler assembles a plurality of body sub-assemblies from the plurality of refuse vehicle body components (104). For example, the vehicle assembler can assemble a body sub-assembly such as a tailgate, which includes vehicle body components such as the tailgate locking mechanism. In other examples, the vehicle assembler can assemble a mounting system, which is configured to mount a refuse vehicle to a frame, using body components such as the track and plate mounting mechanism. In other examples, the vehicle assembler can assemble a hydraulic cylinder sub-assembly using body components such as the hinged clamp, which is configured to secure a hydraulic cylinder. In some examples, the vehicle assembler can assemble a cab of the refuse vehicle including a cab protector using body components such as a cab protector mounting plate, which is configured to be fastened to the refuse vehicle body. In other examples, the vehicle assembler can assemble a hydraulic cylinder sub-assembly using body components such as the hinged clamp, which is configured to secure a hydraulic cylinder. In some examples, the vehicle assembler can assemble a washout tank sub-assembly using body components such as the tank mounting system, which is configured to secure a washout tank. In other examples, the vehicle assembler can assemble body sub-assemblies that include at least one of a mud flap, a broom, a shovel, a prop stop, a fire extinguisher, and a wheel chock using mounting brackets configured to secure one or more of these body sub-assemblies. In some examples, the vehicle assembler can assemble a body sub-assembly using a rail mounting system configured to secure at least one refuse vehicle body component to a chassis of the refuse vehicle. In other examples, the vehicle assembler can assemble a hopper door using body components such as the door lifting mechanism. In other examples, the vehicle assembler can assemble a hydraulic cylinder assembly using body components such as the pin cover. In some examples, the vehicle assembler can assemble a service hoist cylinder sub-assembly using body components such as the hoist bracket, which is configured to secure a service hoist cylinder.

In some embodiments, assembling at least one of the plurality of body sub-assemblies includes welding a first vehicle body component to a second vehicle body component. In some embodiments, assembling at least one of the plurality of body sub-assemblies includes securing a first vehicle body component to a second vehicle body component using mechanical fasteners (e.g., bolts, nuts or the like). In some embodiments, the welding of vehicle body components only occurs prior to painting the vehicle body components. That is, in some embodiments, the body sub-assemblies are assembled by welding two or more vehicle body components to each other, after which the body sub-assemblies are then painted and assembled via fasteners to provide a painted body of a refuse vehicle.

After assembling the body sub-assemblies, the vehicle assembler paints each body sub-assembly independent of other body sub-assemblies (106). For example, the vehicle assembler can inspect each body sub-assembly for mechanical defects (e.g., dents). If any mechanical defects are detected, the vehicle assembler proceeds to repair these mechanical defects prior to performing the next step. In some examples, the vehicle assembler can clean each body sub-assembly by contacting the body sub-assembly with one or more chemicals (e.g., zinc and/or phosphate coatings) and/or sandblasting or grinding the surface of the body sub-assembly to remove any residual oil, rust, dirt, weld scale, and other undesired contaminants that may reduce or otherwise negatively affect paint adhesion onto the surface. Cleaning each body sub-assembly ensures their surfaces provide an adequate substrate to receive the paint. The vehicle assembler can then apply a paint to the surfaces of each body sub-assembly. In some embodiments, the vehicle assembler can apply a primer coating to the surfaces of each body sub-assembly prior to applying a paint coating.

In some embodiments, the vehicle assembler can deposit a paint coating on the surfaces of each body sub-assembly by using electrophoretic deposition (e.g., also known as electrocoating or e-coating). For example, the vehicle assembler can contact the surfaces of each body sub-assembly with a liquid solution including paint, epoxy, and/or other water-based solutions. An electric current can then be used to attract the particles that are suspended in the liquid solution and deposit them onto the surfaces of each body sub-assembly. The electrodeposition process may be continued until a desired level of coating thickness is achieved, which can be regulated by increasing or decreasing a voltage level. The coated surfaces of the body sub-assemblies can then be cured at a high temperature (e.g., about 80° C. to about 260° C.) to promote cross-linking of the paint.

In some embodiments, the vehicle assembler can deposit a paint coating on the surfaces of each body sub-assembly by using powder coating. For example, the vehicle assembler can apply a dry powder, including a specific combination of epoxy resins and various curing agents, to the surfaces of each body sub-assembly. The vehicle assembler can then use a spray gun to electrostatically apply the paint particles onto the surfaces of each body sub-assembly. The paint particles adhere to the surfaces due to their electrostatic charges. The vehicle assembler can then cure the treated surfaces by exposing them to a high temperature (e.g., about 120° C. to about 200° C.), thereby finishing the powder coating process. The exposure to an elevated temperature causes the paint particles to melt and also serves as the catalyst for a chemical reaction that produces the desired finish. In some embodiments, the vehicle assembler can deposit a paint coating on the surfaces of each body sub-assembly by using only on a powder coating process. In some embodiments, the vehicle assembler can deposit a paint coating on the surfaces of each body sub-assembly by using only electrophoretic deposition. In some embodiments, the vehicle assembler can deposit a paint coating on the surfaces of each body sub-assembly by using both a powder coating process and electrophoretic deposition in any suitable order.

After painting each body sub-assembly, the vehicle assembler can assemble the plurality of painted body sub-assemblies to one another on the chassis to provide a painted body of the refuse vehicle (108). In some embodiments, assembling the plurality of painted body sub-assemblies includes attaching a first body sub-assembly to a second body sub-assembly using only mechanical fasteners. In some embodiments, assembling the plurality of painted body sub-assemblies includes attaching the plurality of painted body sub-assemblies to the chassis using only mechanical fasteners. In some embodiments, assembling the plurality of the painted body sub-assemblies excludes welding the sub-assemblies. During this step, the vehicle assembler can operatively connect one or more electrical and/or hydraulic components to one or more of the sub-assemblies, the chassis, and the refuse vehicle body. In some embodiments, the one or more electrical and/or hydraulic components include one or more of an electrical harness, a hydraulic cylinder, a controller, a hydraulic hose, a hydraulic valve, and a sensor.

Figure 2:
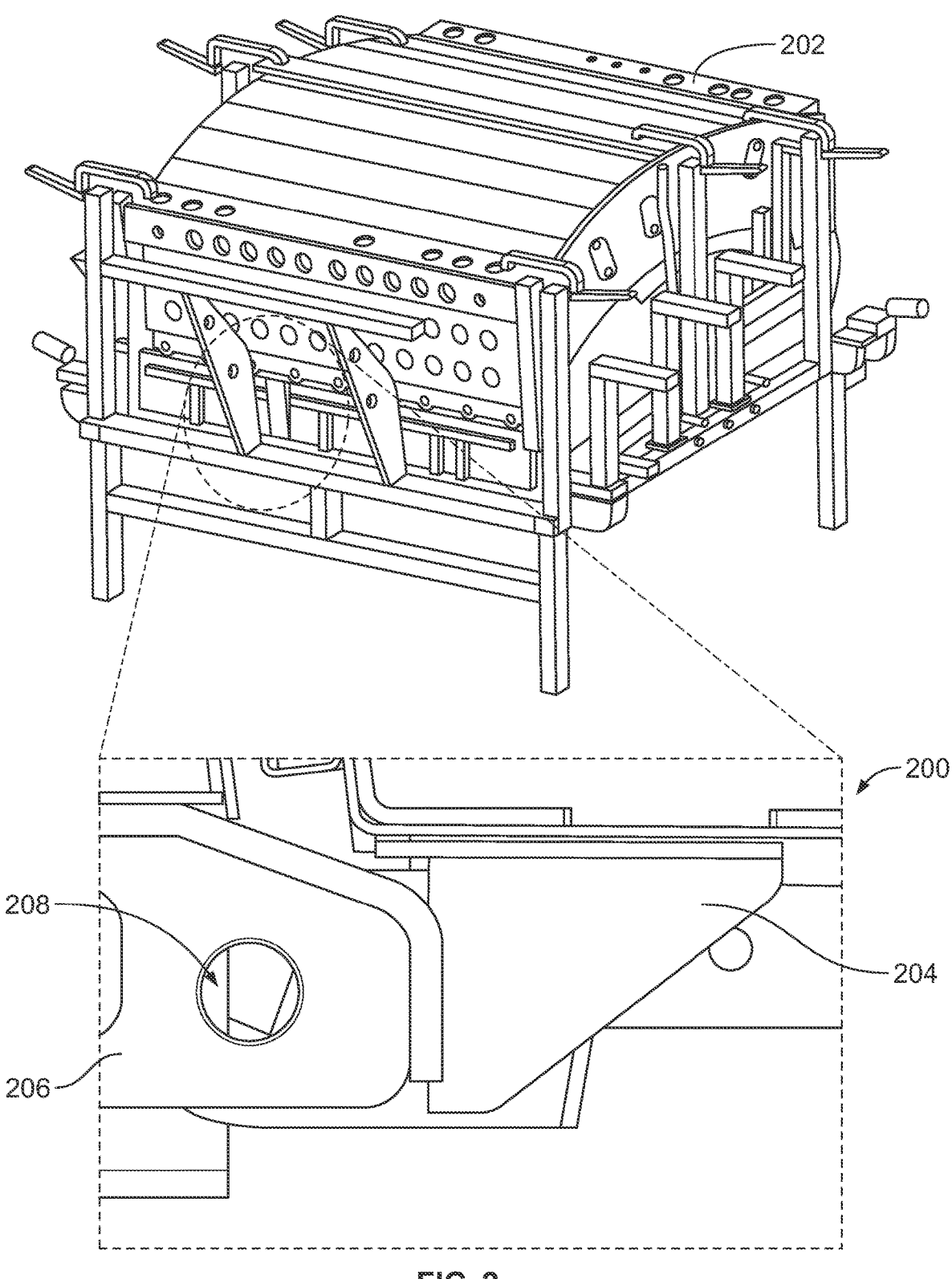
FIG. 2 is an enlarged, top partial view of a tailgate mechanism.

FIGS. 2-16 show examples of various refuse vehicle body components that can be used to assemble a plurality of body sub-assemblies, which can then be painted prior to assembling a painted refuse vehicle. Referring particularly to FIG. 2, in some embodiments, the plurality of refuse vehicle components include a tailgate locking mechanism 200 that can be used to assemble a body sub-assembly including a tailgate 202. The tailgate locking mechanism 200 includes a lug 204 and a locking device 206. The locking device defines a hole 208 that is adapted to receive a pin configured to secure the tailgate 202 to the body of the refuse vehicle. The location of the lug 204 can be standardized across various types of refuse vehicles such that the lug 204 is positioned at the same location, thereby preventing the vehicle assembler from repositioning and re-welding the lug 204 during the assembly of different refuse vehicles.

Figure 3:
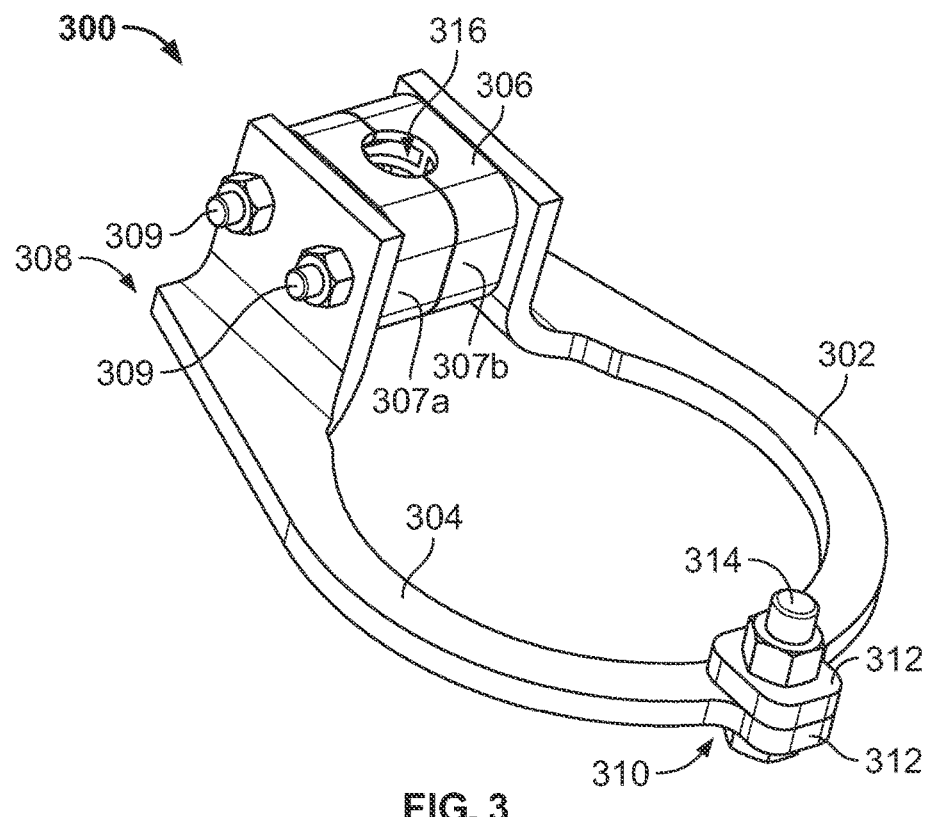
FIG. 3 is a perspective view of a hinged clamp of the refuse vehicle.

Referring particularly to FIG. 3, in some embodiments, the plurality of refuse vehicle body components include a hinged clamp 300 that can be used to assemble a body sub-assembly including a hydraulic cylinder. The hinged clamp 300 includes a first arm 302, a second arm 304, and a holder 306. The first and second arms 302, 304 have a substantially semi-circular shape that curves between a proximal end 308 and a distal end 310. The first and second arms 302, 304 each include a flat portion 312 at each distal end 310, and the flat portions 312 each define a hole configured to receive a fastener 314 (e.g., a nut, a bolt, and/or any other suitable mechanical fastener). When the holes of both flat portions 312 are aligned, the fastener 314 can be used to secure the first and second arms 302, 304 to each other. The holder 306 defines a hole 316 configured to receive a hydraulic tube. The holder includes a first portion 307a and a second portion 307b configured to be secured together by fasteners 309. Each of the first and second portions 307a, 307b define a pair of holes. During assembly, the hinged clamp 300 can be used to secure a hydraulic cylinder and hydraulic tube by installing the hinged clamp around the circumferences of the hydraulic cylinder and the hydraulic tube. For example, the vehicle assembler aligns the flat portions 312 such that both holes defined by the flat portions 312 are aligned. The vehicle assembler inserts the fastener 314 through both holes and fastens the first and second arms 302, 304 with fastener 314. The vehicle assembler then moves the first and second arms 302, 304, including the first and second portions 307a, 307b, away from each other at a distance sufficient to accommodate the circumferences of the hydraulic cylinder and the hydraulic tube. Next, the vehicle assembler encircles the circumference of the hydraulic cylinder with the first and second arms 302, 304 and encircles the circumference of the hydraulic tube with the first and second portions 307a, 307b such that the hydraulic tube is received in hole 316. The vehicle assembler then aligns the first and second portions 307a, 307b such that the holes defined by the first and second portions 307a, 307b are aligned. The vehicle assembler inserts the fasteners 309 through the holes and fastens the fasteners 309 until the hinged clamp 300 is securely attached to the hydraulic cylinder and the hydraulic tube. In some embodiments, due to its design, the hinged clamp 300 can be used to secure hydraulic tubes of various circumferences without damaging the surface of the hydraulic tube (e.g., scratching a paint coating off the surface). In some embodiments, the hinged clamp 300 is a horseshoe-shaped clamp.

Figure 4:
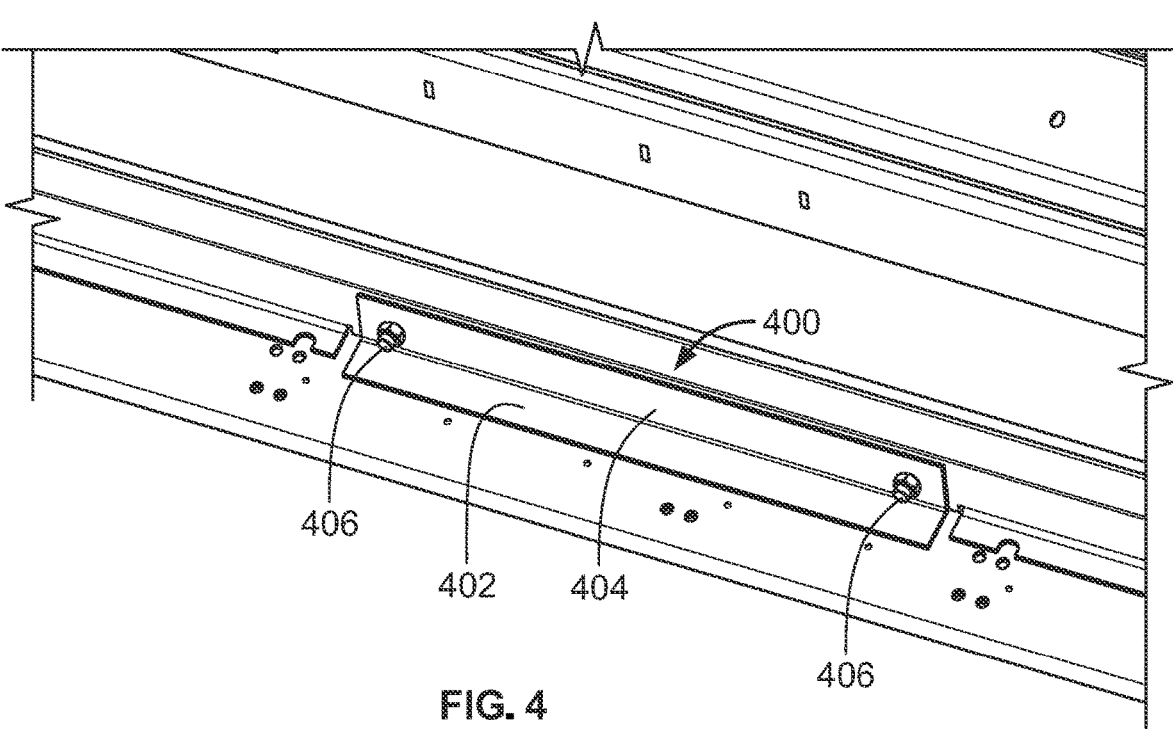
FIG. 4 is a perspective view of a cab protector of the refuse vehicle.

Referring particularly to FIG. 4, in some embodiments, the plurality of refuse vehicle body components include a cab protector mounting plate 400 that can be used to assemble a body sub-assembly including a cab protector. The cab protector mounting plate 400 is L-shaped and has a first plate 402 integrally formed with and perpendicular to a second plate 404. The second plate 404 defines a hole at each end, and the hole is configured to receive a fastener 406 (e.g., a nut, a bolt, and/or any other suitable mechanical fastener). Thus, during assembly, the cab protector mounting plate 400 can be secured to the cab protector by fasteners 406. The cab protector can then be assembled to other body sub-assemblies after painting.

Figure 5:
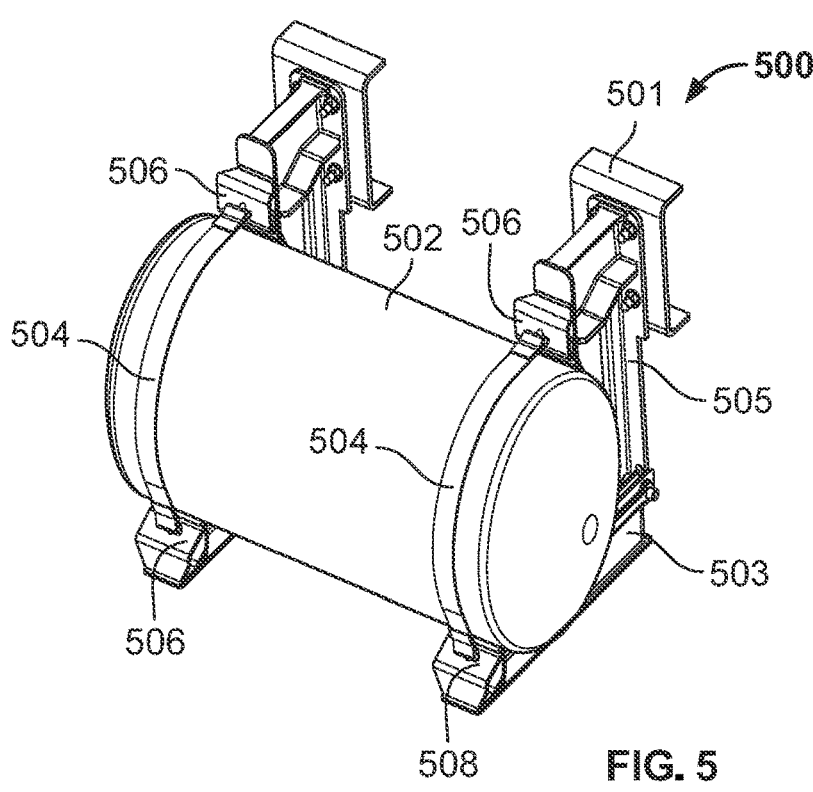
FIG. 5 is a perspective view of a tank mounting system of the refuse vehicle.

Referring particularly to FIG. 5, in some embodiments, the plurality of refuse vehicle body components include a tank mounting system 500 that can be used to assemble a body sub-assembly including a washout tank 502. For example, the tank mounting system 500 includes a pair of straps 504, each strap 504 extending between a first plate 506 and a second plate 508. In some embodiments, the pair of straps 504 can be used to secure tanks (e.g., washout tanks) of various circumferences. Furthermore, the tank mounting system 500 includes a bracket 501 configured to receive the washout tank 502. The bracket 501 is L-shaped and is a two-piece bracket. For example, in some embodiments, the bracket 501 is assembled by fastening or fixating a first piece 503 (e.g., the horizontal leg of the "L" shape) to a second piece 505 (e.g., the vertical leg of the "L" shape). In some embodiments, the bracket 501 is a single-piece weldment bracket that does not require fastening or fixation of numerous components. In some embodiments, the single-piece weldment bracket may advantageously reduce manufacturing time and reduce difficulty in assembling the tank mounting system 500 during manufacturing. In some embodiments, the single-piece weldment bracket is a C-shaped bracket.

Figure 6:
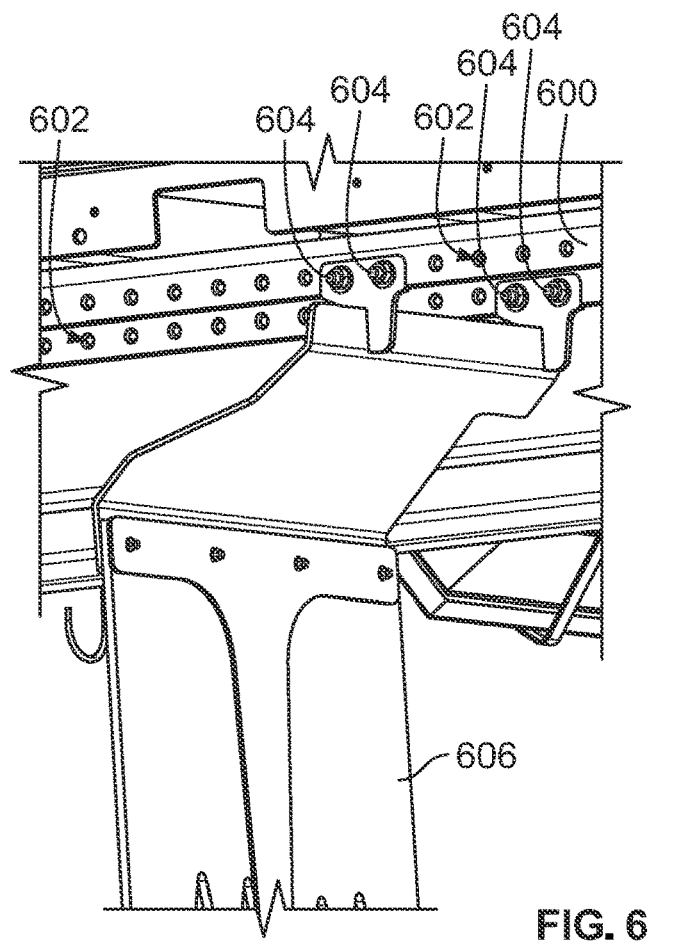
FIG. 6 is a perspective view of a mud flap of the refuse vehicle.

Referring particularly to FIGS. 6-10, in some embodiments, the plurality of refuse vehicle body components include mounting bracket 600, 700, 800, 900, 1000 that can be used to assemble a body sub-assembly including at least one of a mud flap, a broom, a shovel, a prop stop, a fire extinguisher, and a wheel chock. FIG. 6 shows a mounting bracket 600 defining a plurality of holes 602 configured to receive one or more fasteners 604. The mud flap 606 includes a pair of plates 608 defining holes configured to be aligned with the holes 602 of the mounting bracket 600. During assembly, the holes defined by the pair of plates 608 are aligned with the holes 602, and the mud flap 606 is secured to the refuse vehicle body by fastening the fasteners 604 through the holes 602 and the holes defined by the pair of plates 608. In some embodiments, the mud flap 606 can be secured to the refuse vehicle at various locations along the mounting bracket 600.

FIG. 7 shows two elongated mounting brackets 700 defining a plurality of holes 702 configured to receive one or more fasteners 704. The two elongated mounting brackets 700 are secured to the underside of the refuse vehicle and are positioned parallel to one another, as shown in FIG. 7. A pair of retainer plates 706 extend transversely between each elongated mounting bracket 700. The pair of retainer plates 706 include holders 708 configured to hold one or more tools such as a broom 710 and a shovel 712. In some embodiments, the broom 710 and shovel 712 can be removably secured to the holders 708, and the holders 708 can be configured to be secured at various locations along the mounting brackets 700.

FIGS. 8A and 8B show two elongated mounting brackets 800 defining a plurality of holes 802 configured to receive one or more fasteners 804. The two elongated mounting brackets 800 are secured to the underside of the refuse vehicle and are positioned parallel to one another, as shown in FIG. 8B. A prop stop 806 is configured to be secured to one of the elongated mounting brackets 800. The prop stop 806 is configured to set a position of the body prop when the body prop is lowered and the body is raised, thereby aligning the body prop with the body prop rest mounted to the chassis. The prop stop 806 includes a plate 808 defining a slot 810 configured to receive the one or more fasteners 804. In some embodiments, the prop stop 806 can be removably secured at various locations along one of the elongated mounting brackets 800.

Figures 9, 10:
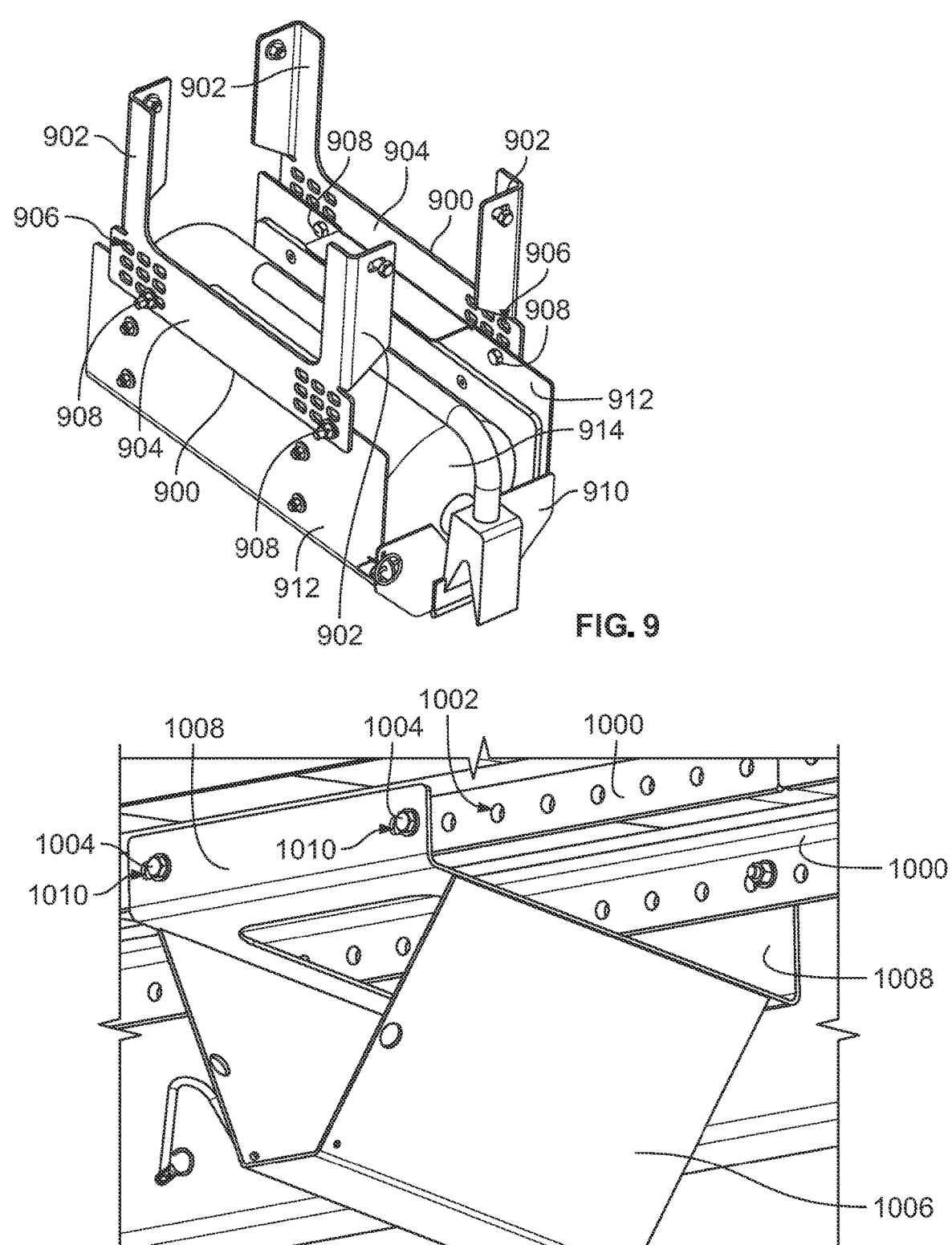
FIG. 9 is a perspective view of a fire extinguisher of the refuse vehicle.
FIG. 10 is a perspective view of a wheel chock of the refuse vehicle.

FIG. 9 shows a pair of opposing mounting brackets 900 configured to be secured to the underside of the refuse vehicle. Each mounting bracket 900 includes a pair of legs 902 extending from a base plate 904. The base plate 904 defines a plurality of holes 906 configured to receive one or more fasteners 908. A holder 910 includes opposing side plates 912 defining one or more holes configured to align with the holes 906. The holder 910 is configured to hold a fire extinguisher 914. During assembly, the side plates 912 are secured to the mounting brackets 900 via fasteners 908. In some embodiments, the holder 910 and fire extinguisher 914 can be removably secured to the refuse vehicle at various locations using the mounting brackets 900 and fasteners 908.

FIG. 10 shows two elongated mounting brackets 1000 defining a plurality of holes 1002 configured to receive one or more fasteners 1004. The two elongated mounting brackets 1000 are secured to the underside of the refuse vehicle and are positioned parallel to one another, as shown in FIG. 10. A wheel chock 1006 is configured to be secured to both of the elongated mounting brackets 1000. The wheel chock 1006 includes a pair of opposing plates 1008, each plate 1008 defining a pair of holes 1010 configured to receive the one or more fasteners 1004. In some embodiments, the wheel chock 1006 can be removably secured at various locations along one of the elongated mounting brackets 1000.

Figure 11:
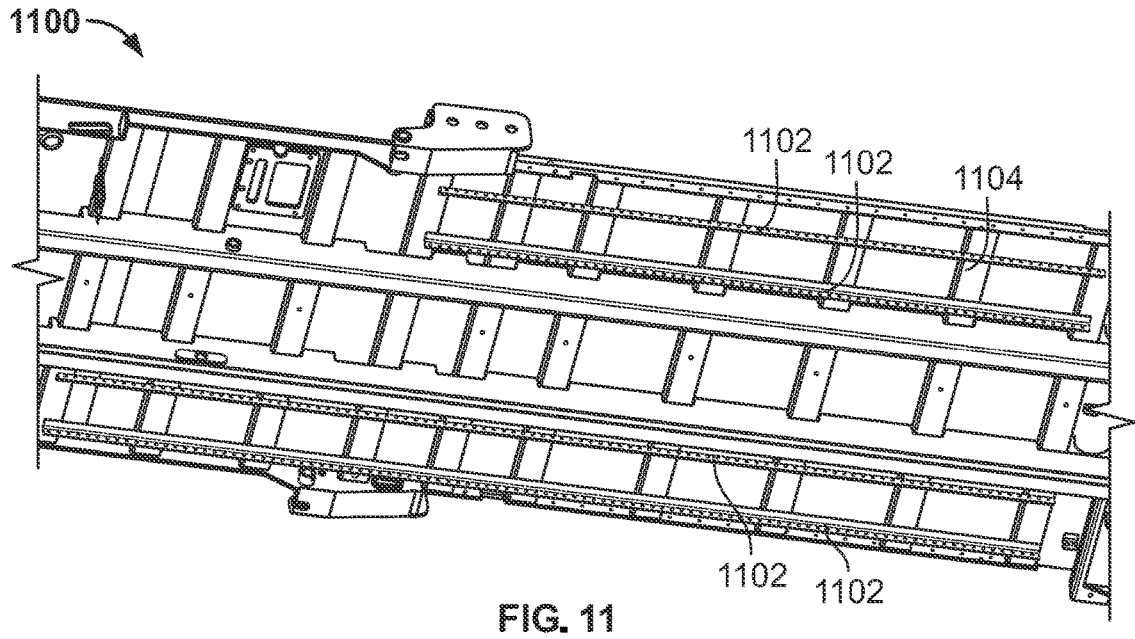
FIG. 11 is a bottom, perspective view of a rail mounting system of the refuse vehicle.

FIG. 11 shows rail mounting system 1100 including two pairs of elongated rails 1102 defining a plurality of holes and configured to receive one or more fasteners. The two pairs of elongated rails 1102 are fixed to the chassis 1104 and configured to secure at least one refuse vehicle body component of the plurality of refuse vehicle body components.

Figure 12:
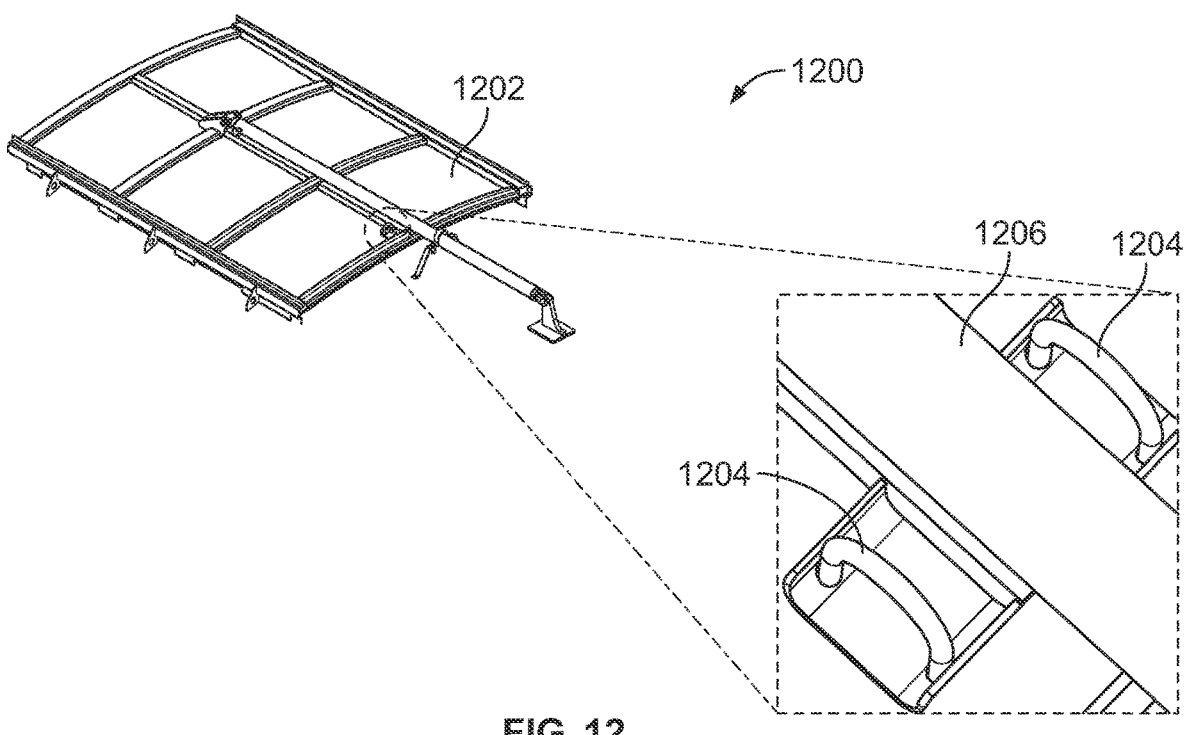
FIG. 12 is an enlarged, perspective view of a door lifting mechanism of the refuse vehicle.

Referring particularly to FIG. 12, in some embodiments, the plurality of refuse vehicle body components include a door lifting mechanism 1200 that can be used to assemble a body sub-assembly including a hopper door 1202. The hopper door 1202 is configured to close off the hopper during movement of the refuse vehicle to reduce blow out of light refuse such as paper or plastic bags. The door lifting mechanism 1200 includes a pair of lugs 1204 configured to facilitate the lifting of the hopper door 1202. The door lifting mechanism 1200 includes a hydraulic cylinder 1206 positioned between the lugs 1204 and configured to actuate the hopper door 1202 between a closed and an open position.

Figure 13:
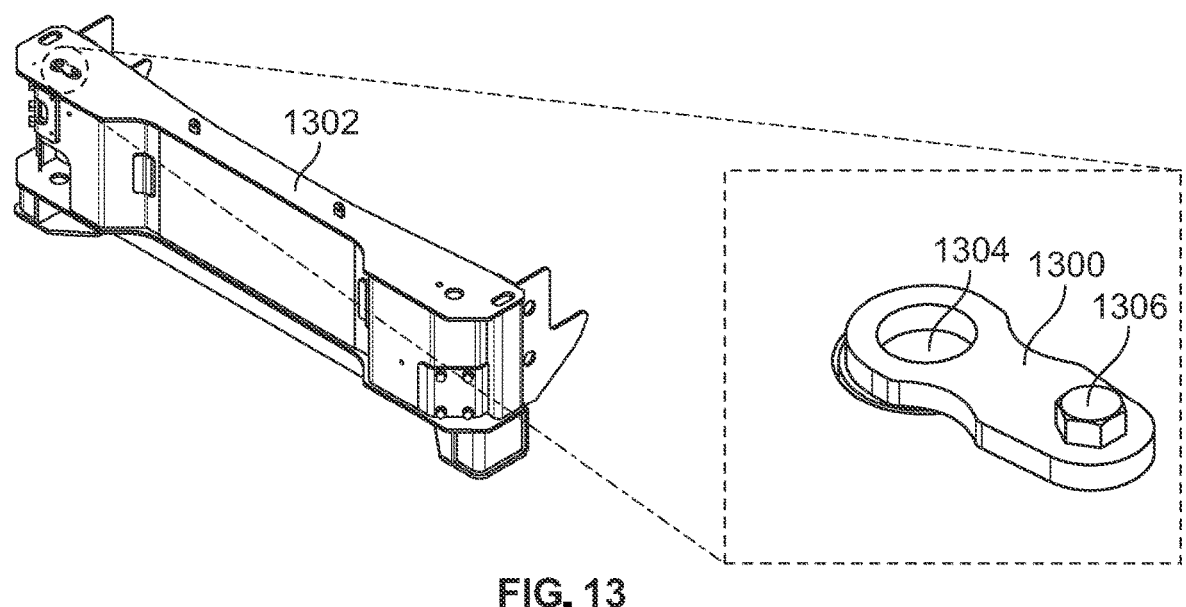
FIG. 13 is an enlarged, perspective view of a hydraulic cylinder assembly of the refuse vehicle.

Referring particularly to FIG. 13, in some embodiments, the plurality of refuse vehicle body components include a pin cover 1300 that can be used to assemble a body sub-assembly including a hydraulic cylinder assembly 1302. The hydraulic cylinder assembly 1302 includes one or more hydraulic cylinders configured to actuate a packer mechanism and one or more hydraulic cylinder pins 1304. The pin cover 1300 is configured to secure the hydraulic cylinder pin 1304. The pin cover 1300 defines a hole configured to receive a fastener 1306. During assembly, the pin cover 1300 is secured to the hydraulic cylinder assembly 1302 via the fastener 1306, thereby preventing axial movement and unfastening of the hydraulic cylinder pin 1304.

Figure 14:
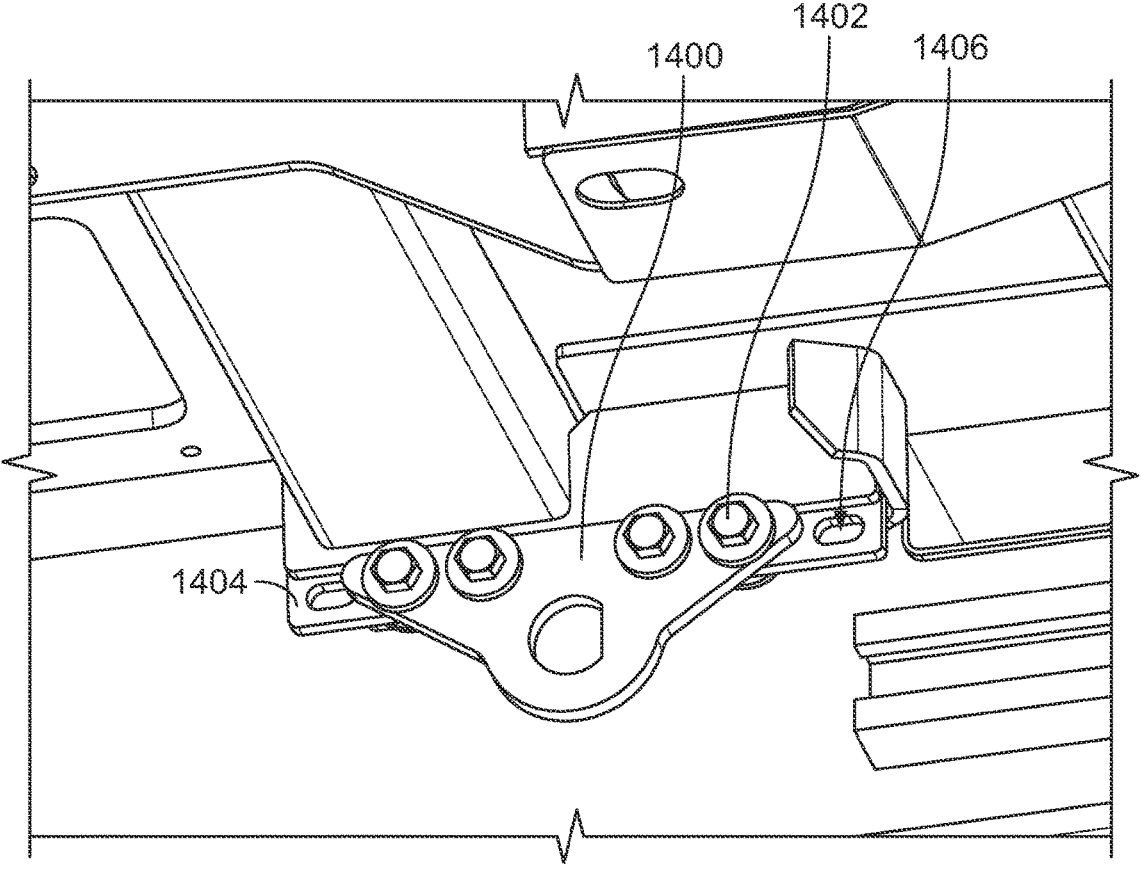
FIG. 14 is a perspective view of a hoist bracket of the refuse vehicle.

Referring particularly to FIG. 14, in some embodiments, the plurality of refuse vehicle body components include a hoist bracket 1400 that can be used to assemble a body sub-assembly including a service hoist cylinder configured to lift the refuse vehicle body away from the chassis. The hoist bracket 1400 is fixed under the floor of the refuse vehicle body and configured to secure the service hoist cylinder. The hoist bracket 1400 defines four holes configured to receive one or more fasteners 1402. The hoist bracket 1400 is further fixed to the refuse vehicle body by using a base bracket 1404 defining a plurality of holes 1406 that are configured to align with the holes defined by the hoist bracket 1400. In some embodiments, the hoist bracket 1400 can be secured to the refuse vehicle body at various locations along the base bracket 1404.

Referring to FIGS. 15A-15C, in some embodiments, the plurality of refuse vehicle body components include a track

1506, a first plate fixed to the chassis, and a second plate that can be used to assemble a body sub-assembly including a mounting system 1500. The mounting system 1500 is configured to couple the refuse vehicle body to the chassis. The various components of the mounting system 1500 are located on the underside of the refuse vehicle body and are configured to allow rotation of the refuse vehicle body with respect to the chassis. For example, certain components of the mounting system 1500 further described below are configured to allow the refuse vehicle body to rotate with respect to the chassis when the refuse vehicle moves in a horizontal direction with respect to the ground and/or when turning. The chassis includes frame rails that may be more flexible than the refuse vehicle body. Therefore, the components of the mounting system 1500 advantageously give the refuse vehicle greater mobility. Furthermore, the various components of the mounting system 1500 are configured to receive one or more springs that are further configured to absorb motion in a substantial vertical direction with respect to the ground. For example, the springs are configured to absorb motion and allow the refuse vehicle body to move vertically or float, with respect to the chassis, when encountering a protuberance on a level surface. Thus, the springs are configured to enable the refuse vehicle body to flex slightly as the chassis flexes when encountering a protuberance on a level surface. The mounting system 1500 can be installed by welding certain components first, then painting said components and the rest of the refuse vehicle, and lastly coupling the remaining components during the final assembly stage. In some embodiments, this method of installation may advantageously reduce time during the final assembly stage, may reduce repeating certain steps of the process such as re-painting after welding, and may increase consistency and quality in manufacturing of the refuse vehicles.

FIGS. 15B and 15C show a mounting system 1500 configured to mount the refuse vehicle body to a frame of a chassis. Referring particularly to FIG. 15B, the components shown in FIG. 15B are located in the underside of the refuse vehicle in an area generally located in a front end of the refuse vehicle, behind the cab. The mounting system 1500 includes a first plate 1502 fixed to the vehicle chassis 1504, a track 1506 fixed to the refuse vehicle body 1508, and a second plate 1510 configured to translate longitudinally along the track 1506 into alignment with the first plate 1502. The first plate 1502 defines holes 1520, and the second plate 1510 defines holes 1518. During assembly, the aligned first and second plates 1502, 1510 receive a pair of springs, which are secured via mechanical fasteners. For example, the mounting system 1500 further includes a third plate 1522 fixed to the second plate 1510 and defining holes 1524 that are configured to be aligned with holes 1520 defined by the first plate 1502. Thus, the third plate 1522 and the first plate 1502 are configured to receive the pair of springs through the holes 1524 and 1520, respectively. The pair of springs can be secured via mechanical fasteners, thereby connecting the first plate 1502 to the second and third plates 1510, 1522. As discussed above, the pair of springs is configured to absorb motion and allow the refuse vehicle body to move vertically or float, with respect to the chassis, when encountering a protuberance on a level surface.

Referring particularly to FIGS. 15A and 15B, the track 1506 is a T-slotted track defining a channel 1512 configured to engage a pair of brackets 1514. The pair of brackets 1514 are sized to be received in the channel 1512 and configured to be secured to the track 1506. Each bracket 1514 defines a pair of holes 1516 configured to align with the holes 1518.

The mounting system 1500 includes one or more mechanical fasteners configured to securely attach the second plate 1510 to the brackets 1514.

FIG. 15C shows the remaining components of the mounting system 1500, which are located in the underside of the refuse vehicle in an area generally located in a rear end of the refuse vehicle, horizontally aligned with the rear tires. The components of the mounting system 1500 shown in FIG. 15C include a first plate 1526 fixed to the vehicle chassis 1504, the track 1506 fixed to the refuse vehicle body 1508, and a second plate 1528 configured to translate longitudinally along the track 1506 into alignment with the first plate 1526. The first plate 1526 defines holes 1530, and the second plate 1528 defines holes 1532. During assembly, the aligned first and second plates 1526, 1528 are securable to one another by mechanical fasteners. For example, the mounting system 1500 further includes a hinge 1534 fixed to the first plate 1526 and defining a hole 1536 configured to receive a body hinge pin 1538 extending from the surface of the second plate 1528. Thus, the hinge 1534 is configured to couple the first and second plates 1526, 1528 to each other. As discussed above, the hinge 1534 is configured to allow the refuse vehicle body to rotate with respect to the chassis when the refuse vehicle moves in a horizontal direction with respect to the ground and/or when turning.

Referring particularly to FIGS. 15A and 15B, each bracket 1514 defines a pair of holes 1516 configured to align with the holes 1532. The mounting system 1500 includes one or more mechanical fasteners configured to securely attach the second plate 1528 to the brackets 1514.

In some embodiments, the vehicle chassis 1504 includes a frame configured to support a refuse vehicle body and including an elongated rail onto which the first plate 1502 may be fixed. In some embodiments, a refuse vehicle can include the vehicle chassis 1504 and the mounting system 1500 including the track 1506 and any of the plates described in FIGS. 15B and 15C.

A mounting system 1700 may be substantially similar in construction and function in several aspects to the mounting system 1500 discussed above, but can exclude a track and brackets and, instead, can include a second plate that is directly fixedly secured to a surface of the refuse vehicle body. For example, in some embodiments, the second plate is welded to the surface of the refuse vehicle body. In some embodiments, the second plate is fastened to the surface of the refuse vehicle body by one or more fasteners.

Figures 17A, 17B, 17C:
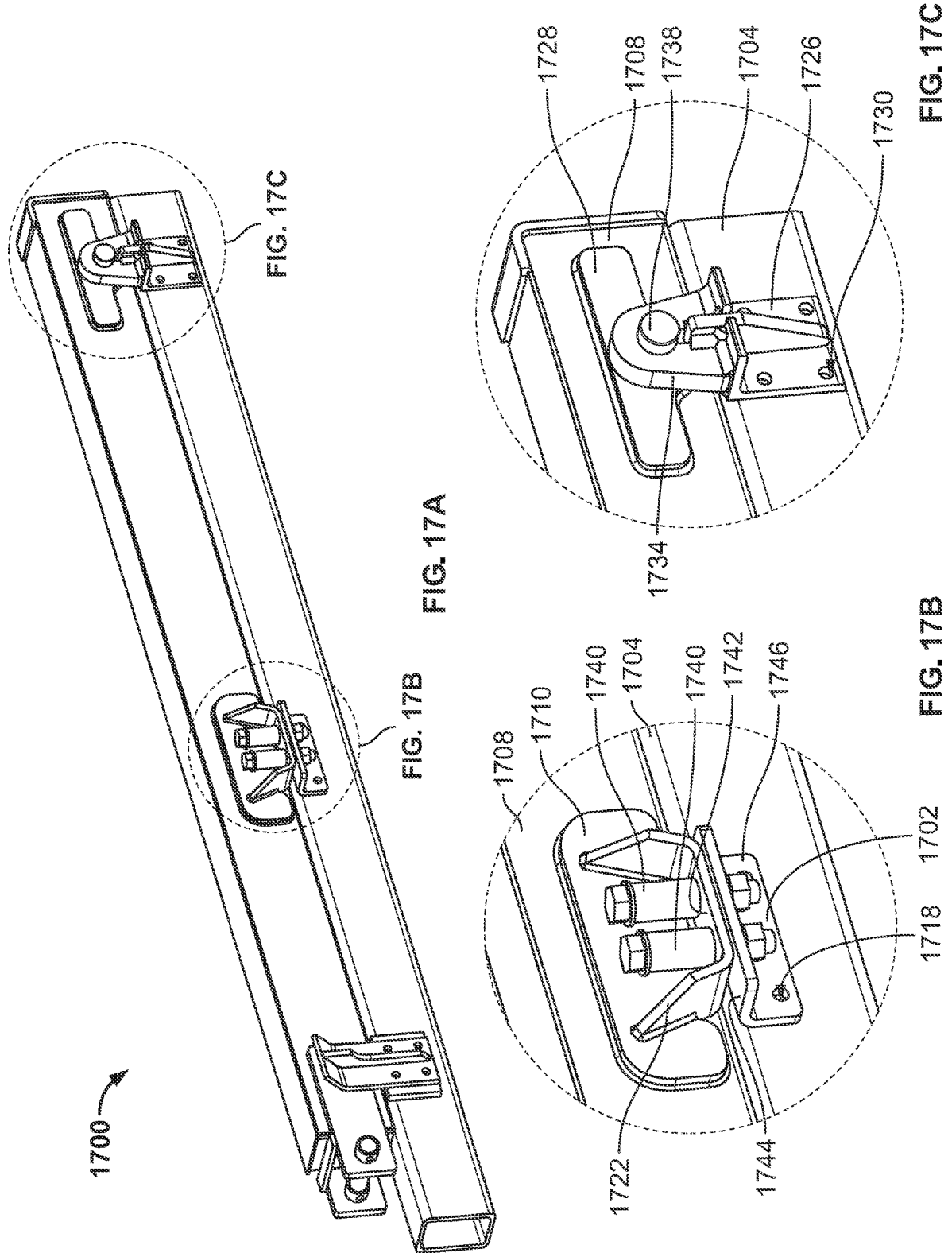
FIGS. 17A, 17B, and 17C are perspective views of a mounting system of the refuse vehicle, which includes first and second plates.

Referring to FIGS. 17A-17C, in some embodiments, the plurality of refuse vehicle body components include a first plate fixed to the chassis and a second plate that can be used to assemble a body sub-assembly including a mounting system 1700. FIGS. 17B and 17C show a mounting system 1700 configured to mount the refuse vehicle body 1708 to a frame of a chassis 1704. Referring particularly to FIG. 17B, the mounting system 1700 includes a first plate 1702 fixed to the vehicle chassis 1704 and a second plate 1710 fixedly secured to a surface of the refuse vehicle body 1708. The second plate 1710 is positioned above and configured to align with the first plate 1702. Similarly to the mounting system 1500 described above, the first plate 1702 defines holes 1718 that are configured to align with holes defined by the surface of the chassis 1704 and to receive one or more mechanical fasteners. Thus, during assembly, the first plate 1702 is secured to the surface of the chassis 1704 via one or more mechanical fasteners that are received by the holes 1718.

The mounting system 1700 further includes a third plate 1722 having a generally U-shape and fixed to the second plate 1710. The third plate 1722 defines holes on a flat, bottom portion 1742 of the U-shape. These holes are configured to be aligned with the holes defined by a flat, horizontal portion 1744 of the first plate 1702 that protrudes outwardly from a flat, vertical portion 1746 of the first plate 1702 and from the surface of the chassis 1704. During assembly, the first and third plates 1702, 1710 are aligned such that each corresponding set of holes is aligned, and a pair of springs 1740 is inserted into the holes and fastened via mechanical fasteners, thereby coupling the first and second plates 1702, 1710 to each other.

FIG. 17C shows another example of a set plates of the mounting system 1700, which, similarly to the mounting system 1500 discussed above, includes a first plate 1726 fixed to the vehicle chassis 1704 and a second plate 1728 fixedly secured to a surface of the refuse vehicle body 1708, directly above the first plate 1726. The first plate 1726 defines holes 1730 that are configured to receive one or more fasteners to secure the first plate 1726 to a surface of the vehicle chassis 1704. The mounting system 1700 further includes a third plate 1734 fixed to the first plate 1726 and defining a hole configured to receive a body hinge pin 1738 extending from the surface of the second plate 1728. Thus, during assembly, the third plate 1734 is configured to couple the first and second plates 1726, 1728 to each other.

A mounting system 1800 may be substantially similar in construction and function in several aspects to the mounting system 1500 discussed above, but can include a track having a pair of shelves extending outwardly away from the track and configured to receive a first plate and a second plate. For example, in some embodiments, the track defines a plurality of holes that are configured to receive one or more fasteners to secure the first and second plates to each other and to the track. In some embodiments, the plurality of holes advantageously allows the user to fasten the mounting system components at several, distinct positions and allows the user to adjust or change a position of the components, if needed.

Figures 18A, 18B, 18C:
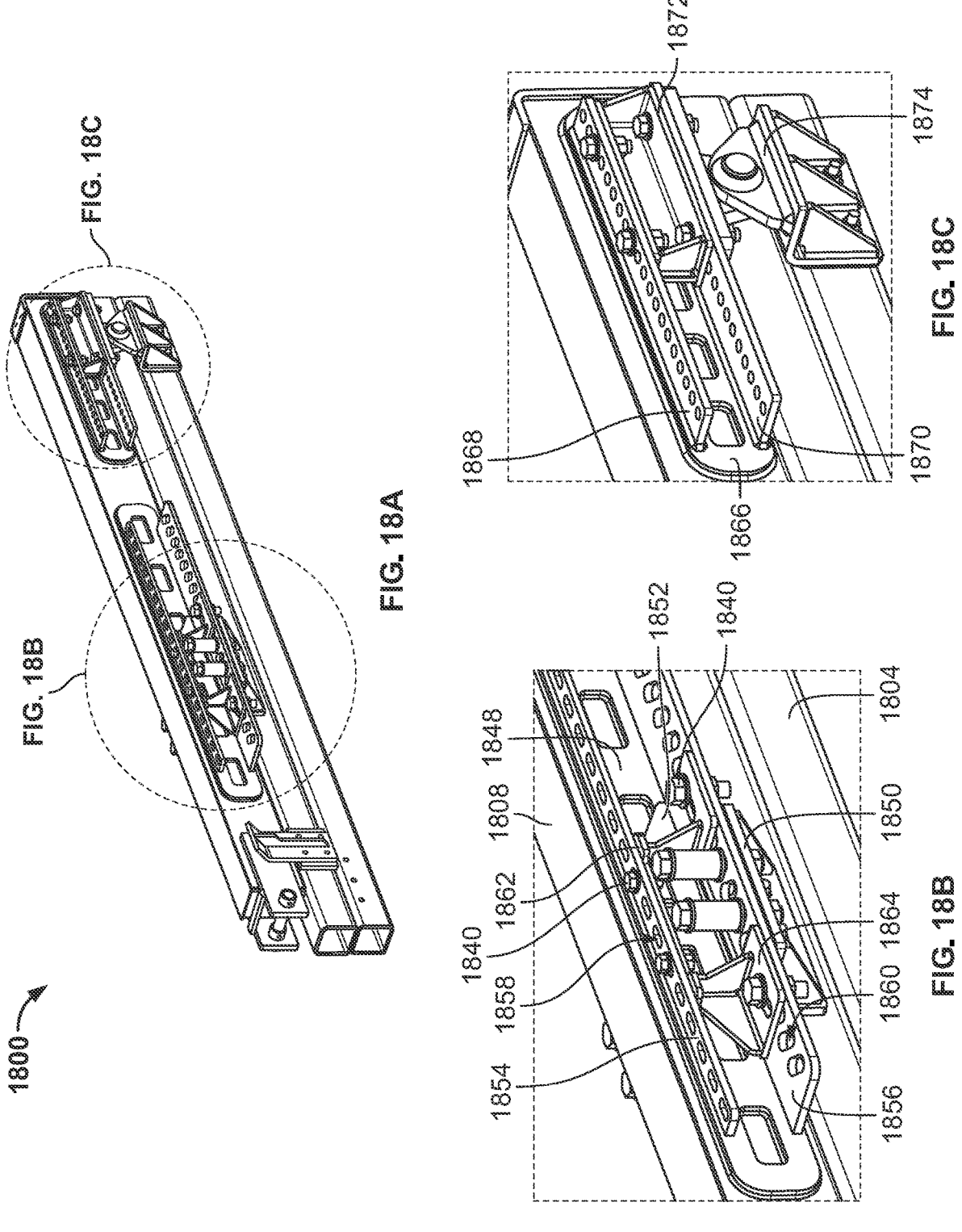
FIGS. 18A, 18B, and 18C are perspective views of a mounting system of the refuse vehicle, which includes first and second plates and a pair of tracks each of which include pair of shelves.

Referring to FIGS. 18A-18C, in some embodiments, the plurality of refuse vehicle body components include a first plate fixed to the chassis and a second plate that can be used to assemble a body sub-assembly including a mounting system 1800. FIGS. 18A-C show a mounting system 1800 configured to mount the refuse vehicle body 1808 to a frame of a chassis 1804. Referring particularly to FIG. 18B, the mounting system 1800 includes a track 1848 fixedly secured to a surface of the refuse vehicle body 1808, a first plate 1850 configured to be secured to the vehicle chassis 1804 and to the track 1848, and a second plate 1852 configured to be secured to a surface of the refuse vehicle body 1808 and to the track 1848. The second plate 1852 is positioned above and configured to align with the first plate 1850 when in an assembled state.

Similarly to the mounting system 1500 described above, the first plate 1850 defines holes that are configured to align with holes defined by the surface of the chassis 1804 and are configured to receive one or more mechanical fasteners. Thus, during assembly, the first plate 1850 is secured to the surface of the chassis 1804 via one or more mechanical fasteners.

Unlike the track 1506 of the mounting system 1500, the track 1848 includes a first shelf 1854 and a second shelf 1856, which oppose each other and extend outwardly away from the track 1848 in a direction that is parallel to a ground surface. The first shelf 1854 defines a plurality of holes 1858 that are configured to align with one or more holes of the second plate 1852 and are configured to receive one or more fasteners. The second shelf 1856 defines a plurality of holes 1860 that are configured to align with one or more holes of the first plate 1850 and are configured to receive one or more fasteners. As shown in FIG. 18B, the first shelf 1854 has a width that is less than a width of the second shelf 1856.

During assembly, the plurality of holes 1858 are aligned with one or more holes defined by a pair of top surface 1862 of the second plate 1852. The second plate 1852 further includes a pair of base surfaces 1864 that oppose the pair of top surfaces 1862. The pair of base surfaces 1864 contact and sit on a surface of the second shelf 1856 when in an assembled state. Furthermore, one or more holes defined by the pair of base surfaces 1864 is aligned with one or more holes of the plurality holes 1860 of the second shelf 1856 such that the second plate 1852 is secured to the first and second shelves 1854, 1856 of the track 1848 via fasteners. A pair of holes of the plurality of holes 1860, that is located between the pair of base surfaces 1864, is configured to receive a pair of springs. Notably, the mounting system 1800 does not require a third plate to receive the pair of springs and secure the first and second plates 1850, 1852 to each other given that the first and second shelves 1854, 1856 of the track 1848 serve this function.

FIG. 18C shows another example of a set plates of the mounting system 1800, which includes a track 1866 that is similar to track 1848 but includes a first shelf 1868 and a second shelf 1870 having substantially equal dimensions. The track 1866 is configured to receive a first plate 1872 within a space defined between the first and second shelves 1868, 1870. A second plate 1874 is secured to the surface of the chassis and to the first plate 1874 via fasteners, as previously described.

A mounting system 1900 may be substantially similar in construction and function in several aspects to the mounting system 1500 discussed above, but can exclude a track and brackets and, instead, can include a second plate that is directly fixedly secured to a surface of the refuse vehicle body and further includes a shelf that is configured to contact and be secured to a first plate. The mounting system 1900 may also be substantially similar in construction and function in several aspects to the mounting system 1800 discussed above, but can exclude the first shelf 1854 defining the plurality of holes 1858. Thus, the mounting system advantageously removes the step of aligning the plurality of holes 1858 with one or more holes of the second plate 1852 and fastening the first shelf 1854 to the second shelf 1856.

Figures 19A, 19B, 19C:
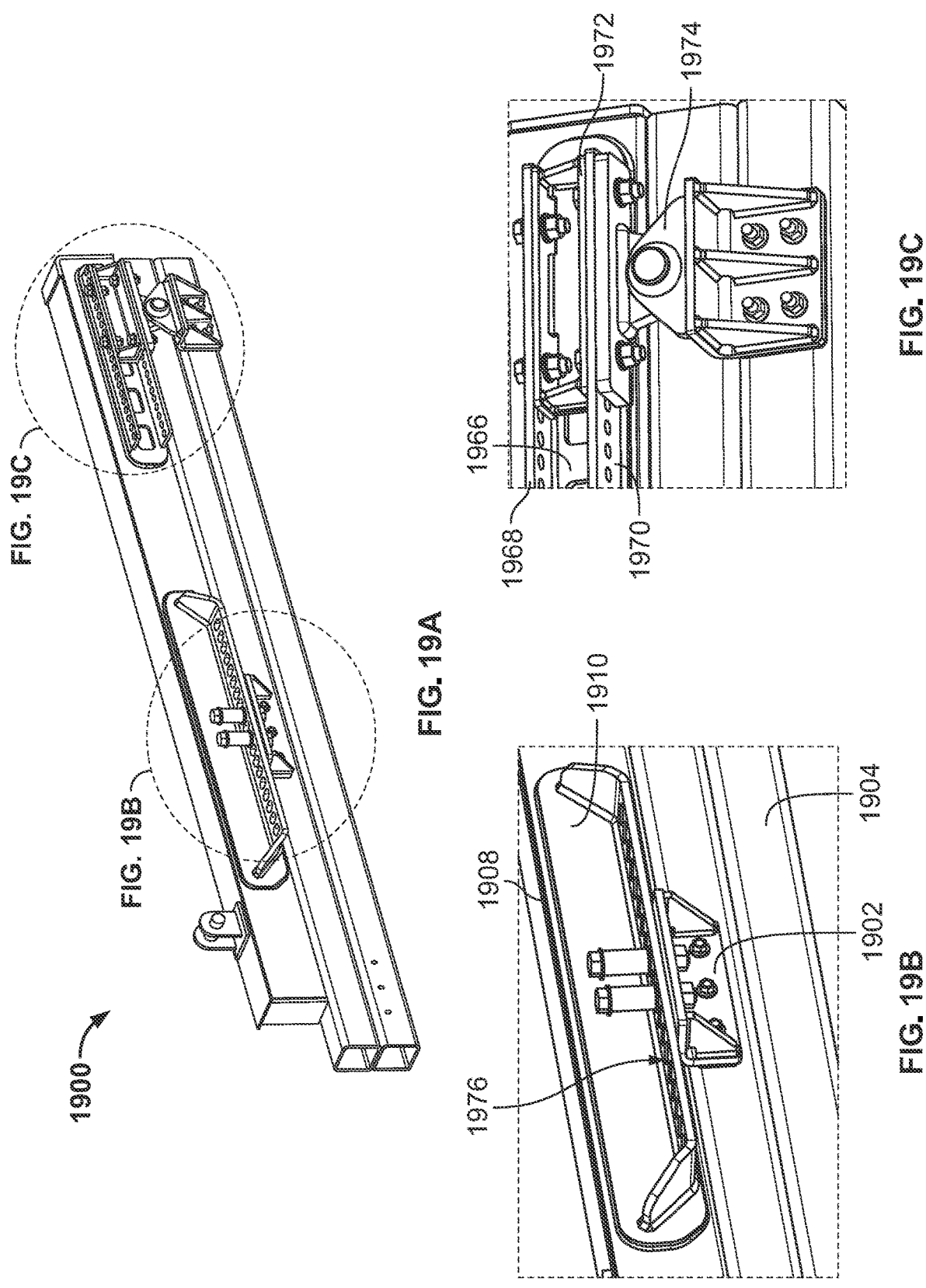
FIGS. 19A, 19B, and 19C are perspective views of a mounting system of the refuse vehicle, which includes a track including a pair of shelves and first and second plates.

Referring to FIGS. 19A-19C, in some embodiments, the plurality of refuse vehicle body components include a first plate fixed to the chassis and a second plate that can be used to assemble a body sub-assembly including a mounting system 1900. FIGS. 19B and 19C show a mounting system 1900 configured to mount the refuse vehicle body 1908 to a frame of a chassis 1904. Referring particularly to FIG. 19B, the mounting system 1900 includes a first plate 1902 fixed to the vehicle chassis 1904 and a second plate 1910 fixedly secured to a surface of the refuse vehicle body 1908. The second plate 1910 is positioned above and configured to align with the first plate 1902. Similarly to the mounting system 1500 described above, the first plate 1902 defines holes that are configured to align with holes defined by the surface of the chassis 1904 and are configured to receive a pair of springs. Thus, during assembly, the first plate 1902 is secured to the surface of the chassis 1904 via the pair of springs and mechanical fasteners.

The second plate 1910 is similar to the second plate 1710 of the mounting system 1700 except the second plate 1910 defines a plurality of holes 1976 instead of only a pair of holes defined by the second plate 1710. In some embodiments, the plurality of holes 1976 may advantageously enable a user to adjust a position of the refuse vehicle body 1908 with respect to the chassis 1904 before assembly.

FIG. 19C shows another example of a set plates of the mounting system 1900, which includes a track 1966 that is similar to track 1866. The track 1966 is configured to receive a first plate 1972 within a space defined between the first and second shelves 1968, 1970. A second plate 1974 is secured to the surface of the chassis and to the first plate 1974 via fasteners, as previously described.

Figure 16A:
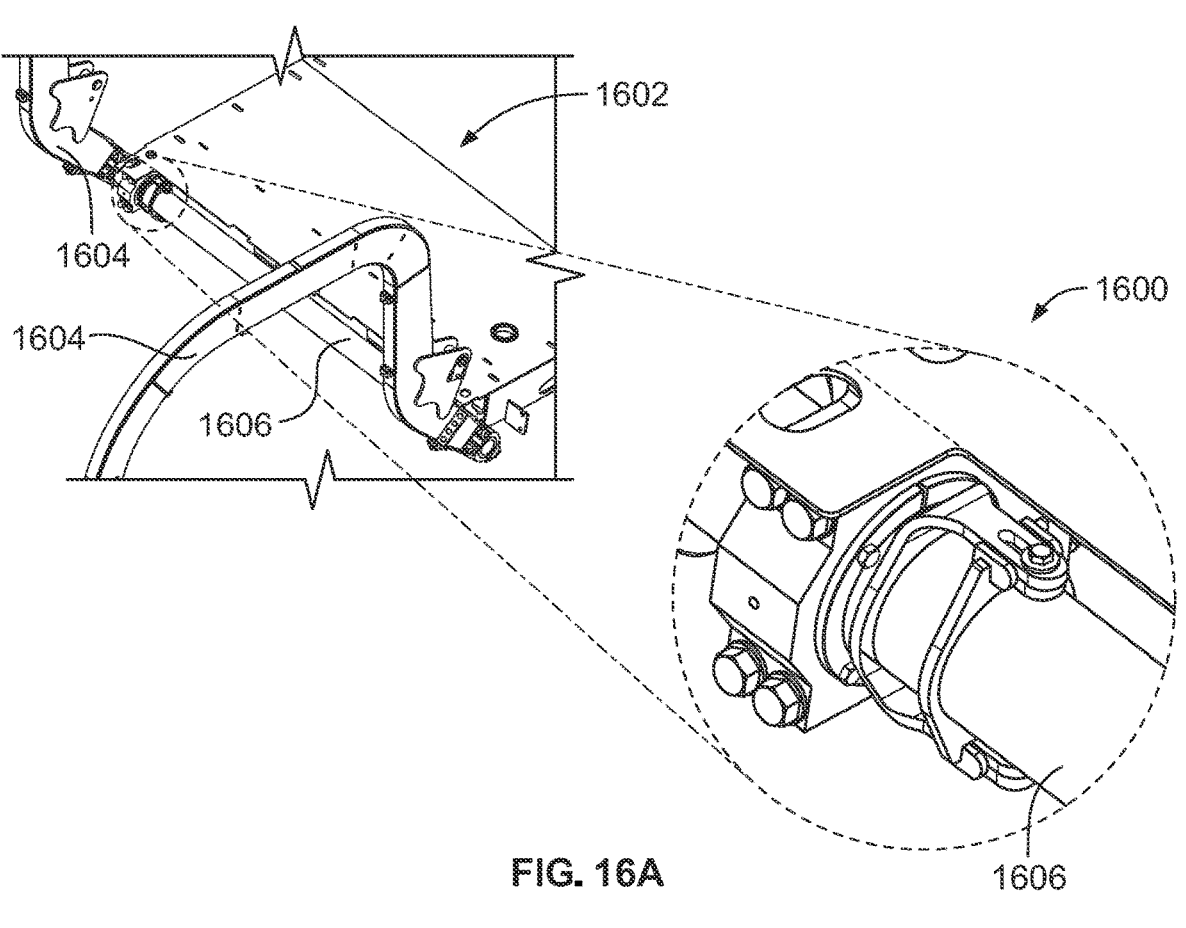
FIGS. 16A and 16B are perspective views of an arm sub-assembly of the refuse vehicle, which includes an arm retaining ring.
Figure 16B:
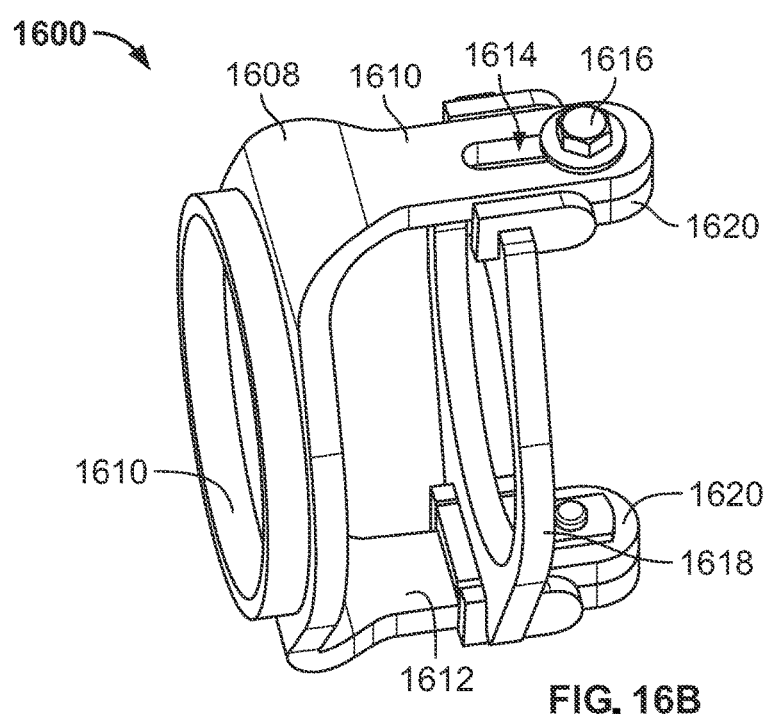

Referring to FIGS. 16A and 16B, in some embodiments, the plurality of refuse vehicle body components include an arm retaining ring 1600 can be used to assemble a body sub-assembly including an arm sub-assembly 1602. The arm sub-assembly 1602 includes a pair of arms 1604, a torque tube 1606 coupled to and extending between the pair of arms 1604, and the arm retaining ring 1600. The arm retaining ring 1600 is configured to receive the torque tube 1606. The torque tube 1606 is configured to transfer torque between the arms 1604 to ensure the arms 1604 lift together.

Referring particularly to FIG. 16B, the arm retaining ring 1600 includes a first ring 1608 including a rim 1610 and two opposing, longitudinal portions 1612 extending from the rim 1610. Each of the two opposing, longitudinal portions 1612 define a slot 1614 configured to receive a fastener 1616. The arm retaining ring 1600 includes a second ring 1618 including a pair of connector plates 1620. Each connector plate 1620 is configured to couple to the two opposing, longitudinal portions 1612 by the fasteners 1616. Each connector plate 1620 defines a hole configured to align with the slot 1614 and receive the fastener 1616. The arm retaining ring 1600 is configured to securely couple to the torque tube 1606 by one or more fasteners 1616 configured to extend through the hole defined by the connector plate 1620 and the slot 1614. In some embodiments, the arm retaining ring 1600 prevents the torque tube 1606 from having axial movement, which could cause the arms 1604 to interfere with the body and/or cab of the refuse vehicle. In some embodiments, a refuse vehicle can include the arm sub-assembly 1602 including the arm retaining ring 1600.

Figure 20:
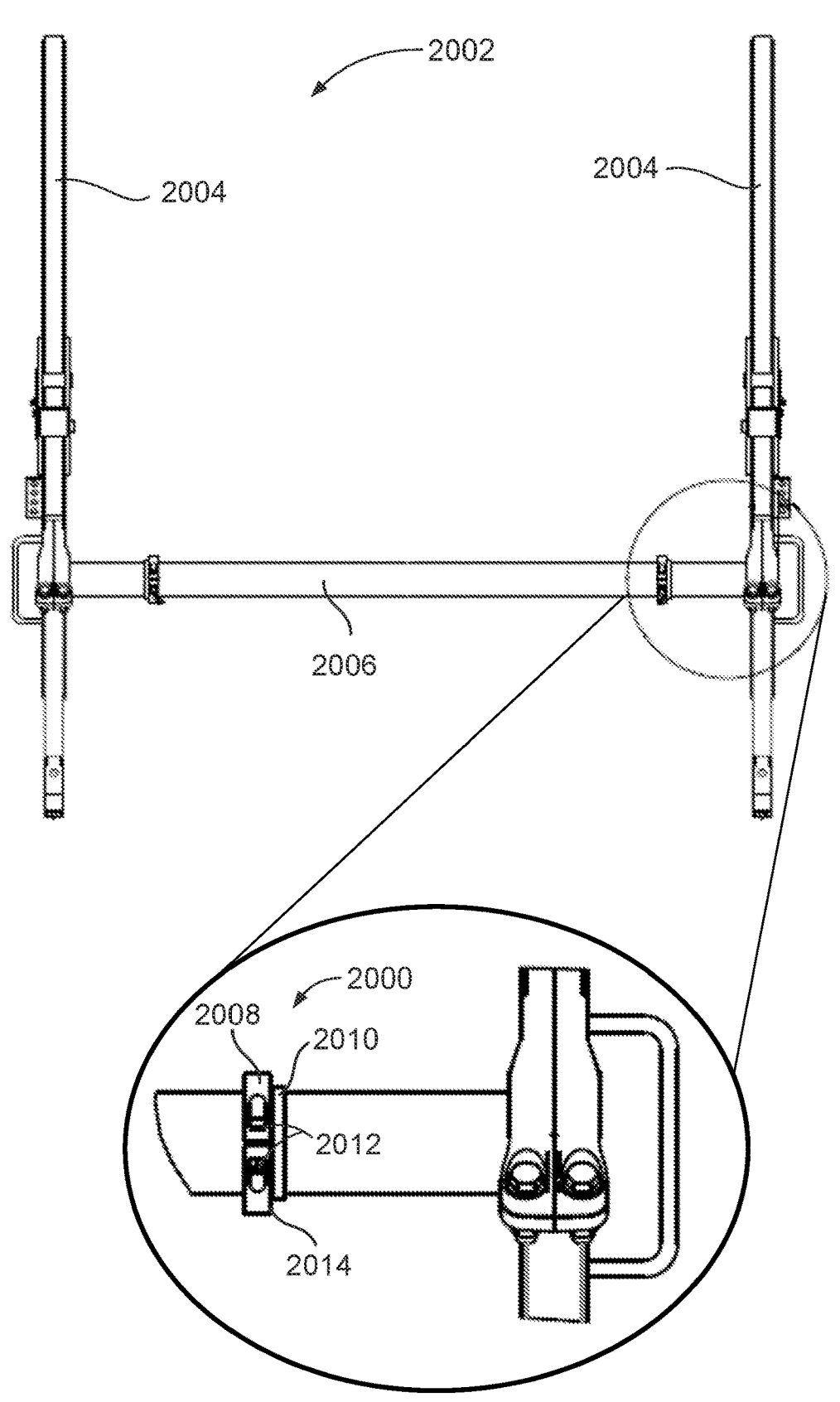
FIG. 20 is a front view of yet another example of an arm sub-assembly of the refuse vehicle, which includes an arm retaining ring.

Referring to FIG. 20, in some embodiments, the plurality of refuse vehicle body components include an arm retaining ring 2000 can be used to assemble a body sub-assembly including an arm sub-assembly 2002. The arm sub-assembly 2002 includes a pair of arms 2004, a torque tube 2006 coupled to and extending between the pair of arms 2004, and the arm retaining ring 2000. The arm retaining ring 2000 is configured to receive the torque tube 2006 and to abut a bearing block of the arm sub-assembly 2002. The torque tube 2006 is configured to transfer torque between the arms 2004 to ensure the arms 2004 lift together. The arm retaining ring 2000 includes a clamp 2008 and a step 2010 that is integrally formed with and extends radially from one side 2014 of the clamp 2008. During installation, the clamp 2008 is positioned adjacent to the bearing block such that the step abuts the bearing block. The step 2010 is sized to enable clearance for one or more fasteners of the bearing block. Additionally, the step 2010 is configured to allow a user to ensure that the clamp 2008 is properly aligned and parallel to the bearing block and is also configured to provide a user a positive reference point for proper installation. The clamp 2008 is a two-piece clamp that is configured to be coupled with the torque tube 2006. The clamp 2008 defines a pair of holes 2012 that are each configured to receive a fastener to couple the clamp 2008 to the torque tube 2006. In some embodiments, the clamp includes a pair of steps that are integrally formed with and extend radially from opposing sides of the clamp 2008. In some embodiments, a first piece of the two-piece clamp includes a first step that is integrally formed with and extends radially from a first side of the clamp, and a second piece of the two-piece clamp includes a second step that is integrally formed with and extends radially from a second side of the clamp that opposes the first side. In other words, in this example, the clamp can include a pair or steps that extend from opposing sides. In some embodiments, the arm retaining ring is a single, unitary component.

Figure 21:
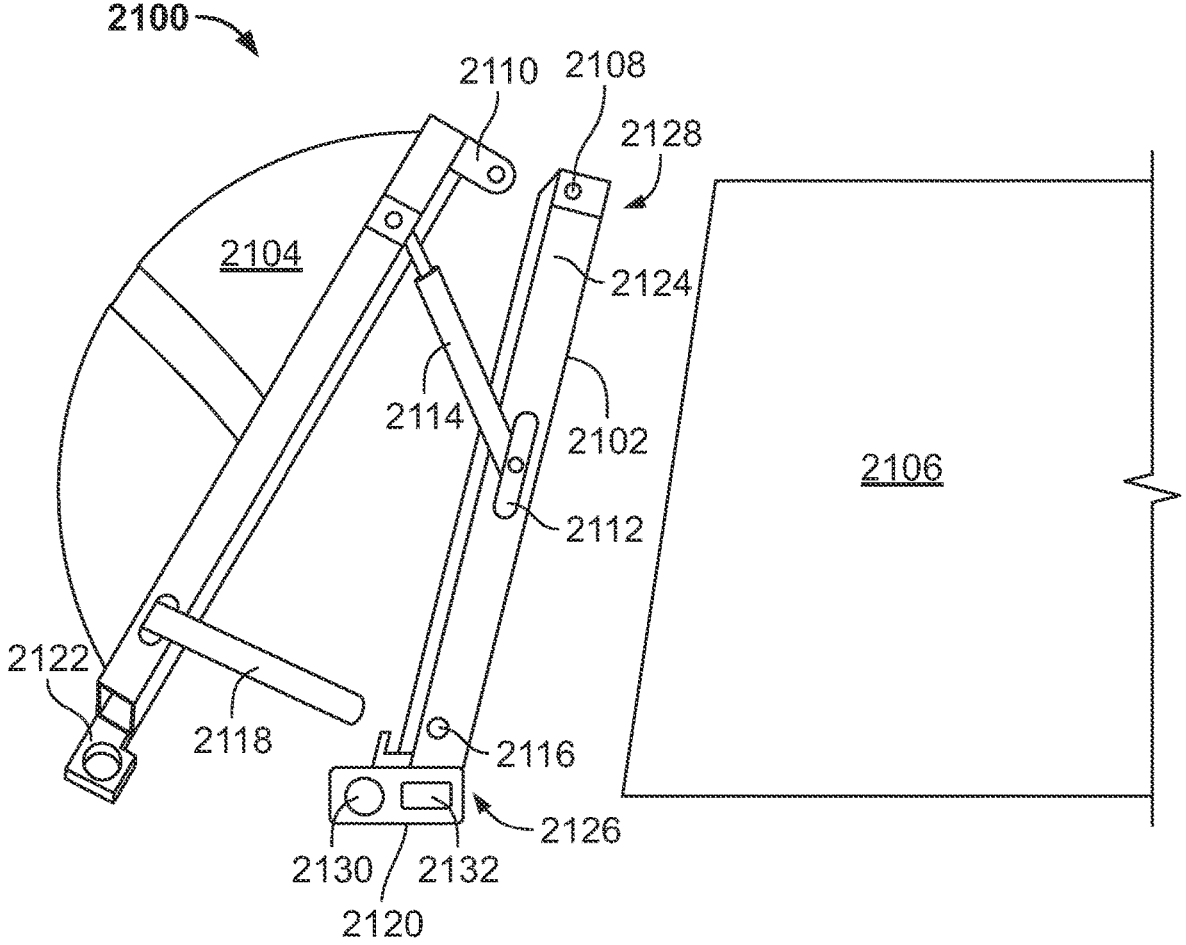
FIG. 21 is a side view of a tailgate hang subassembly.

Referring to FIG. 21, a tailgate hang subassembly 2100 includes a tailgate hang frame 2102 configured to enable various tailgate components to be fixtured prior to being assembled and installed on the refuse vehicle body. Conventional methods of assembling include painting the tailgate components after individually securing them to the body of the refuse vehicle. However, it is common for alterations to address fitting issues of the tailgate components to occur after assembling, which can then require re-painting of such tailgate components. Re-painting these tailgate components can delay the overall process of assembling the refuse vehicle. Thus, the time to assemble the refuse vehicle may advantageously be reduced by having the tailgate hang frame 2102 include various tailgate components (e.g., a pair of tailgate hinge brackets 2108, a pair of tailgate raise cylinder lugs 2112, a pair of tailgate prop openings 2116, and one or more tailgate hang plates 2120) that are pre-fixtured instead of individually securing them to the refuse vehicle body and potentially individually addressing fitting issues of each component. The tailgate hang subassembly 2100 may also enable more repeatability and consistency in the refuse vehicle assembly process.

The tailgate hang frame 2102 is configured to be secured (e.g., by using any suitable fastener such as bolts) to a rear portion 2106 of the refuse vehicle body. The tailgate hang frame 2102 includes a pair of vertical opposing arms 2124 connected at respective lower ends 2126 by a horizontal tailgate seal bar. The pair of vertical opposing arms 2124 is also connected at respective upper ends 2128 by a horizontal bar. In some embodiments, the horizontal bar is curved or sized and shaped to couple with a corresponding upper edge of the tailgate.

The tailgate hang frame 2102 includes a pair of tailgate hinge brackets 2108, a pair of tailgate raise cylinder lugs 2112, a pair of tailgate prop openings 2116, and one or more tailgate hang plates 2120. Each of the tailgate hinge brackets 2108 is located at the upper end 2128 of the arm 2124 of the tailgate hang frame 2102. Each of the tailgate hinge brackets 2108 is configured to engage and couple a tailgate hinge 2110 of the tailgate 2104. Each of the tailgate raise cylinder lugs 2112 is located below the tailgate hinge bracket 2108, between the upper and lower ends 2128, 2126 of the arm 2124. Each of the tailgate raise cylinder lugs 2112 is configured to couple a tailgate raise cylinder 2114 of the tailgate 2104. Each of the tailgate prop openings 2116 is defined by a surface of the arm 2124 near the lower end 2126 of the arm 2124. Each of the tailgate prop openings 2116 is configured to receive a tailgate prop bar 2118 of the tailgate 2104. Each of the tailgate prop bar 2118 is configured to be inserted into the tailgate prop openings 2116 to support the tailgate 2104 in a partially opened position.

Each of the tailgate hang plates 2120 extends outwardly from the lower end 2126 of the arm 2124 of the tailgate hang frame 2102. The tailgate hang plates 2120 define a first opening 2130 and a second opening 2132. Each of the tailgate hang plates 2120 is configured to align with an eye 2122 of the tailgate 2104. For example, at least the first opening 2130 is configured to concentrically align with the eye 2122. In some embodiments, the tailgate hang frame 2102 includes a pair of opposing tailgate hang plates 2120 in close proximity to each other and extending outwardly from each lower end 2126 of the arm 2124. In this example, each eye 2122 is configured to be received between each pair of opposing tailgate hang plates 2120 at each lower end 2126 of the arm 2124. In some embodiments, the first and second openings 2130, 2132 are configured to align with at least a portion of the eye 2122.

While a number of examples have been described for illustration purposes, the foregoing description is not intended to limit the scope of the invention, which is defined by the scope of the appended claims. For example, a baling system may have more or less scales than shown, or more or less anchor points, or a different arrangement or number of flanges. There are and will be other examples and modifications within the scope of the following claims.

What is claimed is:

1. A method of assembling a refuse vehicle, the method comprising:

obtaining a chassis and a plurality of refuse vehicle body components;

assembling a plurality of body sub-assemblies from the plurality of refuse vehicle body components, wherein at least one body sub-assembly of the plurality of body sub-assemblies comprises a mounting system configured to mount a refuse vehicle body to a frame, and wherein at least two refuse vehicle body components of the plurality of refuse vehicle body components are a track and a first plate fixed to the chassis;

painting each body sub-assembly independent of other body sub-assemblies in the plurality of body sub-assemblies; and after painting, assembling the plurality of painted body sub-assemblies to one another on the chassis to provide a painted body of the refuse vehicle.

2. The method of claim 1, wherein the plurality of body sub-assemblies comprises a tailgate, and wherein the plurality of refuse vehicle body components comprises a tailgate locking mechanism including a lug.

3. The method of claim 1, wherein the plurality of refuse vehicle body components comprises a second plate configured to translate longitudinally along the track into alignment with the first plate.

4. The method of claim 1, wherein at the plurality of body sub-assemblies comprises a hydraulic cylinder, and wherein the plurality of refuse vehicle body components comprises a hinged clamp configured to secure the hydraulic cylinder.

5. The method of claim 1, wherein at least one of the plurality of body sub-assemblies comprises a washout tank, and wherein the plurality of refuse vehicle body components comprises a tank mounting system comprising one more straps configured to secure the washout tank.

6. The method of claim 1, wherein the plurality of body sub-assemblies comprises at least one of a mud flap, a broom, a shovel, a prop stop, a fire extinguisher, and a wheel chock, and wherein the plurality of refuse vehicle body components comprises a mounting bracket defining one or more holes configured to receive a mechanical fastener to secure the at least one of the mud flap, broom, shovel, prop stop, fire extinguisher, and wheel chock to the refuse vehicle.

7. The method of claim 1, wherein the plurality of refuse vehicle body components comprises a rail mounting system comprising one or more elongated rails fixed to the chassis, the one or more elongated rails configured to secure at least one refuse vehicle body component of the plurality of refuse vehicle body components.

8. The method of claim 1, wherein the plurality of body sub-assemblies comprises a service hoist cylinder, and wherein the plurality of refuse vehicle body components comprises a hoist bracket configured to secure the service hoist cylinder.

9. The method of claim 1, wherein painting each body sub-assembly independent of other body sub-assemblies in the plurality of body sub-assemblies comprises powder-coating each body sub-assembly independent of other body sub-assemblies in the plurality of body sub-assemblies.

10. The method of claim 1, wherein assembling at least one of the plurality of body sub-assemblies comprises welding a first vehicle body component of the plurality of refuse vehicle body components to a second vehicle body component of the plurality of refuse vehicle body components.

11. The method of claim 1, wherein assembling the plurality of painted body sub-assemblies comprises attaching a first body sub-assembly to a second body sub-assembly using only mechanical fasteners.

12. The method of claim 1, wherein assembling the plurality of painted body sub-assemblies comprises attaching the plurality of painted body sub-assemblies to the chassis using only mechanical fasteners.

13. The method of claim 1, wherein assembling the plurality of the painted body sub-assemblies excludes welding the sub-assemblies.

14. The method of claim 1, wherein assembling the plurality of painted body sub-assemblies comprises connecting one or more electrical and/or hydraulic components to one or more of the sub-assemblies, the chassis, and the refuse vehicle body.

15. A method of assembling a refuse vehicle, the method comprising:

obtaining a chassis and a plurality of refuse vehicle body components;

assembling a plurality of body sub-assemblies from the plurality of refuse vehicle body components, wherein at least one body sub-assembly of the plurality of body sub-assemblies comprises a washout tank, and wherein at least one refuse vehicle body component of the plurality of refuse vehicle body components is a tank mounting system comprising one or more straps configured to secure the washout tank;

painting each body sub-assembly independent of other body sub-assemblies in the plurality of body sub-assemblies; and after painting, assembling the plurality of painted body sub-assemblies to one another on the chassis to provide a painted body of the refuse vehicle.

16. The method of claim 15, wherein painting each body sub-assembly independent of other body sub-assemblies in the plurality of body sub-assemblies comprises powder-coating each body sub-assembly independent of other body sub-assemblies in the plurality of body sub-assemblies.

17. The method of claim 15, wherein assembling at least one of the plurality of body sub-assemblies comprises welding a first vehicle body component of the plurality of refuse vehicle body components to a second vehicle body component of the plurality of refuse vehicle body components.

18. The method of claim 15, wherein assembling the plurality of painted body sub-assemblies comprises at least one of:

attaching a first body sub-assembly to a second body sub-assembly using only mechanical fasteners; or attaching the plurality of painted body sub-assemblies to the chassis using only mechanical fasteners.

19. The method of claim 15, wherein assembling the plurality of the painted body sub-assemblies excludes welding the sub-assemblies.

20. The method of claim 15, wherein assembling the plurality of painted body sub-assemblies comprises connecting one or more electrical and/or hydraulic components to one or more of the sub-assemblies, the chassis, and the refuse vehicle body.

* * * * *